United States Patent
Dhawan et al.

(10) Patent No.: US 8,958,483 B2
(45) Date of Patent: Feb. 17, 2015

(54) AUDIO/VIDEO CONTENT SYNCHRONIZATION AND DISPLAY

(75) Inventors: Anmol Dhawan, Ghaziabad (IN); Sachin Soni, Delhi (IN); Sachin Gaur, Ghaziabad (IN); Ganesh Sahai, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1805 days.

(21) Appl. No.: 11/713,959

(22) Filed: Feb. 27, 2007

(65) Prior Publication Data

US 2014/0029916 A1      Jan. 30, 2014

(51) Int. Cl.
*H04N 11/02*         (2006.01)
*H04N 9/87*          (2006.01)

(52) U.S. Cl.
CPC .................................... *H04N 9/87* (2013.01)
USPC .................. 375/240.26; 375/240.01; 386/248

(58) Field of Classification Search
CPC ......... H04N 9/8205; H04N 9/87; H04N 5/76; G11B 27/105
USPC .......................... 375/240.01, 240.26; 386/248
See application file for complete search history.

(56) References Cited

U.S. PATENT DOCUMENTS

| 5,054,360 A | 10/1991 | Lisle et al. |
| 5,883,804 A | 3/1999 | Christensen |
| 6,094,671 A | 7/2000 | Chase et al. |
| 6,389,541 B1 | 5/2002 | Patterson |
| 6,523,069 B1 | 2/2003 | Luczycki et al. |
| 6,553,412 B1 | 4/2003 | Kloba et al. |
| 6,834,195 B2 | 12/2004 | Brandenberg et al. |
| 6,892,193 B2 | 5/2005 | Bolle et al. |
| 6,961,714 B1 | 11/2005 | LeVlne |
| 7,308,413 B1 | 12/2007 | Tota et al. |

(Continued)

FOREIGN PATENT DOCUMENTS

| WO | WO-0135290 A1 | 5/2001 |
| WO | WO-0219720 A2 | 3/2002 |

(Continued)

OTHER PUBLICATIONS

"How to create and use Flash video metadata to add cue-points with flvtool2", Posted by carson under web design , linux , utilities,(Dec 8, 2006; Accessed Jan. 6, 2007),6 pgs.

(Continued)

*Primary Examiner* — Baotran N To
(74) *Attorney, Agent, or Firm* — Shook, Hardy & Bacon L.L.P.

(57) ABSTRACT

In one embodiment, a method is illustrated as including generating tagging data using a computer system to tag certain portions of digital content for playing at a normal rate and inserting the tagging data into a field of a data packet to create tagged digital content. In another embodiment, a further method is illustrated as including generating a metadata file using a computer system to denote certain portions of digital content for playing at a normal rate and inserting the metadata file into a media stream containing the certain portions of digital content. Additionally, in a further embodiment, a system is illustrated as including a generator residing on a device to generate tagging data to tag certain portions of digital content for playing at normal rate and an inserter residing on the device to insert the tagging data into a field of a data packet to create tagged digital content.

22 Claims, 16 Drawing Sheets

(56) References Cited

U.S. PATENT DOCUMENTS

| | | | |
|---|---|---|---|
| 7,797,352 | B1 | 9/2010 | Hopwood et al. |
| 7,849,487 | B1* | 12/2010 | Vosseller .................. 725/88 |
| 8,001,143 | B1 | 8/2011 | Gupta et al. |
| 2002/0023058 | A1 | 2/2002 | Taniguchi et al. |
| 2002/0033844 | A1 | 3/2002 | Levy et al. |
| 2002/0069218 | A1 | 6/2002 | Sull et al. |
| 2002/0092019 | A1 | 7/2002 | Marcus |
| 2002/0097265 | A1 | 7/2002 | Kurapati et al. |
| 2002/0163532 | A1 | 11/2002 | Thomas et al. |
| 2003/0004966 | A1 | 1/2003 | Bolle et al. |
| 2003/0028896 | A1 | 2/2003 | Swart et al. |
| 2003/0128880 | A1 | 7/2003 | Akimoto et al. |
| 2003/0135464 | A1 | 7/2003 | Mourad et al. |
| 2003/0203713 | A1 | 10/2003 | Onishi |
| 2004/0002993 | A1 | 1/2004 | Toussaint et al. |
| 2004/0088729 | A1 | 5/2004 | Petrovic et al. |
| 2004/0128317 | A1 | 7/2004 | Sull et al. |
| 2005/0015713 | A1 | 1/2005 | Plastina et al. |
| 2005/0122960 | A1 | 6/2005 | Khan |
| 2005/0152666 | A1 | 7/2005 | Demeyer |
| 2005/0165795 | A1 | 7/2005 | Myka et al. |
| 2005/0203927 | A1 | 9/2005 | Sull et al. |
| 2005/0283791 | A1 | 12/2005 | McCarthy et al. |
| 2005/0288991 | A1 | 12/2005 | Hubbard et al. |
| 2006/0059526 | A1 | 3/2006 | Poslinski |
| 2006/0078292 | A1 | 4/2006 | Huang et al. |
| 2006/0092282 | A1 | 5/2006 | Herley et al. |
| 2006/0121987 | A1 | 6/2006 | Bortnik et al. |
| 2006/0190616 | A1 | 8/2006 | Mayerhofer et al. |
| 2007/0038931 | A1 | 2/2007 | Allaire et al. |
| 2007/0078898 | A1 | 4/2007 | Hayashi et al. |
| 2007/0106660 | A1 | 5/2007 | Stern et al. |
| 2007/0168542 | A1* | 7/2007 | Gupta et al. .................. 709/231 |
| 2007/0214485 | A1 | 9/2007 | Bodin et al. |
| 2008/0052343 | A1 | 2/2008 | Wood |
| 2008/0056297 | A1 | 3/2008 | Gaur et al. |
| 2008/0306936 | A1 | 12/2008 | Ho et al. |
| 2009/0271514 | A1 | 10/2009 | Thomas et al. |
| 2010/0325641 | A1 | 12/2010 | Holmes et al. |

FOREIGN PATENT DOCUMENTS

| | | | |
|---|---|---|---|
| WO | WO-2005025217 | A1 | 3/2005 |
| WO | WO-2005125190 | A2 | 12/2005 |

OTHER PUBLICATIONS

Moorer, James A., "The digital audio processing station: A new concept in audio postproduction", *The Droid Works*, San Rafael, CA 94912, (Jun. 1986),10 pgs.

Smith, Julius O., "Unit Generator Implementation on the Next DSP Chip", *Proceedings of the International Computer Music Conference*, 1989, 303-306.

"U.S. Appl. No. 11/444,642, Examiner Interview Summary mailed Apr. 12, 2010", 3 pgs.

"U.S. Appl. No. 11/444,642, Examiner Interview Summary mailed Jul. 13, 2010", 3 pgs.

"U.S. Appl. No. 11/444,642, Final Office Action mailed Feb. 8, 2010", 16 pgs.

"U.S. Appl. No. 11/444,642, Final Office Action mailed Oct. 25, 2010", 16 pgs.

"U.S. Appl. No. 11/444,642, Non-Final Office Action mailed May 25, 2010", 12 pgs.

"U.S. Appl. No. 11/444,642, Notice of Allowance mailed May 9, 2011", 9 pgs.

"U.S. Appl. No. 11/444,642, Notice of Allowance mailed Jun. 8, 2011", 5 pgs.

"U.S. Appl. No. 11/444,642, Notice of Panel Decision mailed Mar. 1, 2011", 2 pgs.

"U.S. Appl. No. 11/444,642, Pre-Appeal Brief filed Jan. 25, 2011", 5 pgs.

"U.S. Appl. No. 11/444,642, Response filed Aug. 20, 2010 to Non-Final Office Action mailed May 25, 2010", 13 pgs.

"U.S. Appl. No. 11/444,642, Response filed May 10, 2010 to Final Office Action mailed Feb. 8, 2010", 15 pgs.

"U.S. Appl. No. 11/669,002, Final Office Action mailed Oct. 8, 2010", 17 pgs.

"U.S. Appl. No. 11/669,002, Non Final Office Action mailed Mar. 22, 2011", 20 pgs.

"U.S. Appl. No. 11/669,002, Non-Final Office Action mailed Apr. 7, 2010", 19 pgs.

"U.S. Appl. No. 11/669,002, Response filed Jan. 10, 2011 to Final Office Action mailed Oct. 8, 2010", 11 pgs.

"U.S. Appl. No. 11/669,002, Response filed Jun. 22, 2011 to Non-Final Office Action mailed Mar. 22, 2011", 7 pgs.

"U.S. Appl. No. 11/669,002, Response filed Jul. 6, 2010 to Non-Final Office Action mailed Apr. 7, 2010", 11 pgs.

"U.S. Appl. No. 11/724,871, Non Final Office Action mailed Jun. 23, 2011", 15 pgs.

"U.S. Appl. No. 11/820,586, Notice of Allowance mailed May 28, 2010", 12 pgs.

"U.S. Appl. No. 11/820,586, Response filed Feb. 10, 2010 to Non-Final Office Action mailed Nov. 20, 2009", 8 pgs.

"U.S. Appl. No. 12/875,276, Final Office Action mailed Mar. 28, 2011", 10 pgs.

"U.S. Appl. No. 12/875,276, Non-Final Office Action mailed Oct. 15, 2010", 12 pgs.

"U.S. Appl. No. 12/875,276, Response filed Jan. 18, 2011 to Non-Final Office Action mailed Oct. 15, 2011", 11 pgs.

"U.S. Appl. No. 12/875,276, Response filed Jun. 28, 2011 to Non-Final Office Action mailed Mar. 28, 2011", 9 pgs.

Almeida, Pedro, et al., "SInBAD—A Digital Library to Aggregate Multimedia Documents", Proceedings of the Advanced International Conference on Telecommunications and International Conference on Internet and Web Applications and Services, (2006), 6 pgs.

Doenges, Peter K, et al., "Audio/Video and Synthetic Graphics/Audio for Mixed Media", Signal Processing: Image Communication 9, (1997), 433-463.

Minerva Yeung, et al., "Extracting story units from long programs for video browsing and navigation", IEEE, (Jun. 17-23, 1996), 296-305.

O'Connor, et al., "News story segmentation in the Fischlar video indexing system", vol. 3, IEEE, (2001), 418-421.

"U.S. Appl. No. 11/444,642 Non Final Office Action Mailed Aug. 18, 2009", 12 pgs.

"U.S. Appl. No. 11/444,642, Response filed Nov. 13, 2009 to Non Final Office Action mailed Aug. 18, 2009", 19 pgs.

"U.S. Appl. No. 11/669,002, Final Office Action mailed Jul. 9, 2009", 20 pgs.

"U.S. Appl. No. 11/669,002, Non-Final Office Action mailed Jan. 23, 2009", 17 pgs.

"U.S. Appl. No. 11/669,002, Response filed Apr. 21, 2009 to Non Final Office Action mailed Jan. 23, 2009", 11 pgs.

"U.S. Appl. No. 11/669,002, Response filed Dec. 9, 2009 to Final Office Action mailed Jul. 9, 2009", 10 pgs.

"U.S. Appl. No. 11/820,586, Non-Final Office Action mailed Nov. 20, 2009", 10 pgs.

"U.S. Appl. No. 11/820,586, Response filed Aug. 21, 2009 to Restriction Requirement mailed Jul. 23, 2009", 7 pgs.

"U.S. Appl. No. 11/820,586, Restriction Requirement mailed Jul. 23, 2009", 6 pgs.

"Get Comments Quickly With Clip Notes", [online]. © Adobe Systems Incorporated, 2006. [created Jan. 17, 2006 ]. Retrieved from the Internet: <URL: http://www.adobe.com/designcenter/premiere/articles/prp2it_clipnotes/prp2it_clipnotes.pdf>, (2006), 3 pgs.

"The Vote Average for Film X Should be Y! Why Are You Displaying Another Rating?", [online]. © 1990-2006, Internet Movie Database, Inc. [retrieved on Apr. 27, 2006 ]. Retrieved from the Internet: <URL: http://msn-uk.imdb.com/help/show_leaf?voteaverage>, 2 pgs.

"U.S. Appl. No. 11/444,642, Appeal Brief filed Mar. 31, 2011", 28 pgs.

"U.S. Appl. No. 11/669,002, Final Office Action mailed Sep. 15, 2011", 12 pgs.

"U.S. Appl. No. 11/669,002, Response filed Jan. 20, 2012 to Final Office Action mailed Sep. 15, 2011", 11 pgs.

"U.S. Appl. No. 11/724,871, Examiner Interview Summary mailed Aug. 16, 2011", 3 pgs.

(56) References Cited

OTHER PUBLICATIONS

"U.S. Appl. No. 11/724,871, Response filed Sep. 12, 2011 to Non-Final Office Action mailed Jun. 23, 2011", 11 pgs.
"U.S. Appl. No. 12/875,276, Final Office Action Mailed Feb. 6, 2012", 9 pgs.
"U.S. Appl. No. 12/875,276, Non-Final Office Action mailed Sep. 7, 2011", 8 pgs.
"U.S. Appl. No. 12/875,276, Response filed Dec. 5, 2011 to Non-Final Office Action mailed Sep. 7, 2011", 10 pgs.
"U.S. Appl. No. 11/669,002, Examiner Interview Summary mailed Jan. 16, 2013", 3 pgs.
"U.S. Appl. No. 11/669,002, Examiner Interview Summary mailed Jul. 11, 2012", 3 pgs.
"U.S. Appl. No. 11/669,002, Final Office Action mailed Dec. 5, 2012", 10 pgs.
"U.S. Appl. No. 11/669,002, Response filed Aug. 27, 2012 to Non Final Office Action mailed May 25, 2012", 8 pgs.
"U.S. Appl. No. 12/875,276, Appeal Brief filed Sep. 11, 2012", 18 pgs.
"U.S. Appl. No. 12/875,276, Decision on Pre-Appeal Brief mailed Jul. 11, 2012", 2 pgs.
"U.S. Appl. No. 12/875,276, Examiners Answer mailed Dec. 7, 2012", 8 pgs.
"Star Wars", http://sebastianheycke.de/a_starwars/movie2.html, (Downloaded Sep. 10, 2007).
Girgensohn, A., et al., "Facilitating Video Access by Visualizing Automatic Analysis", *Human-Computer Interaction Interact '99, IOS Press*, (1999), 205-212.
Lee, Hyowon, "The Fischlar Digital Video Recording, Analysis and Browsing System", *Proceedings of RIAO '2000: ContentBased Multimedia Information Access*, Paris, France., (Apr. 12-14, 2000), 1-10.

\* cited by examiner

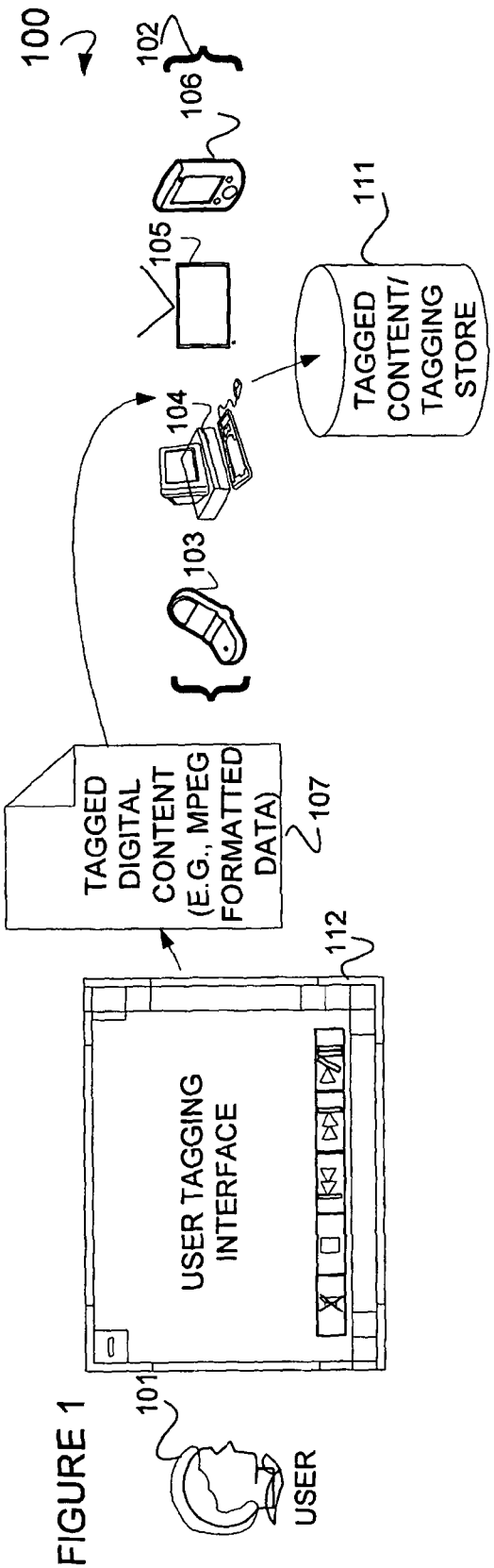
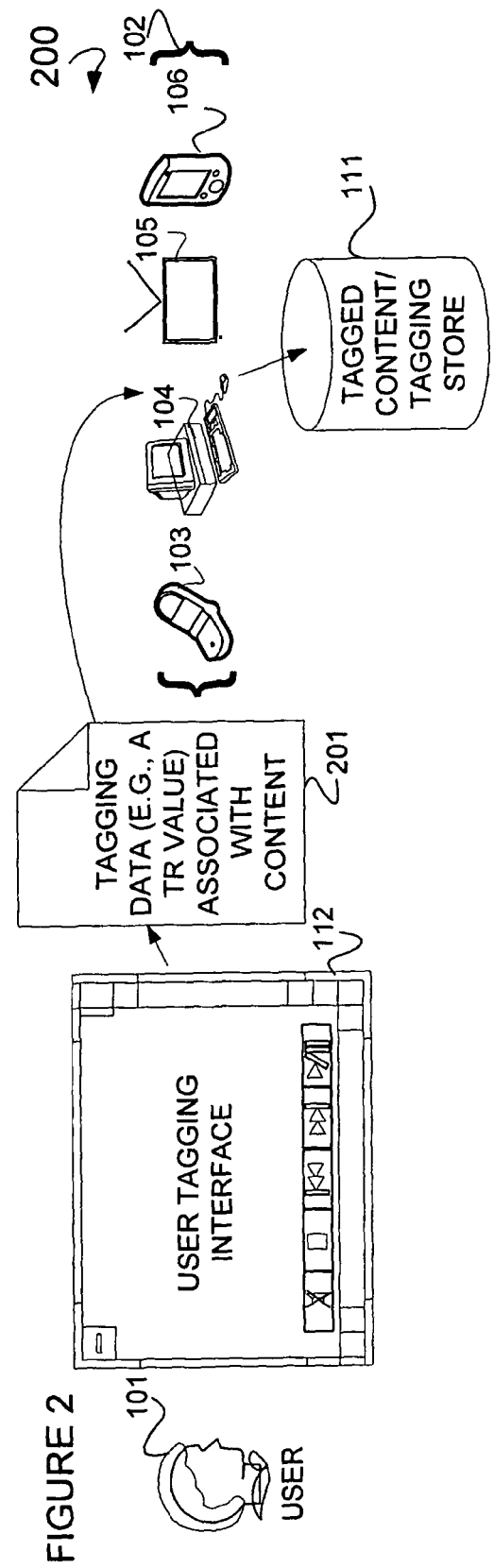

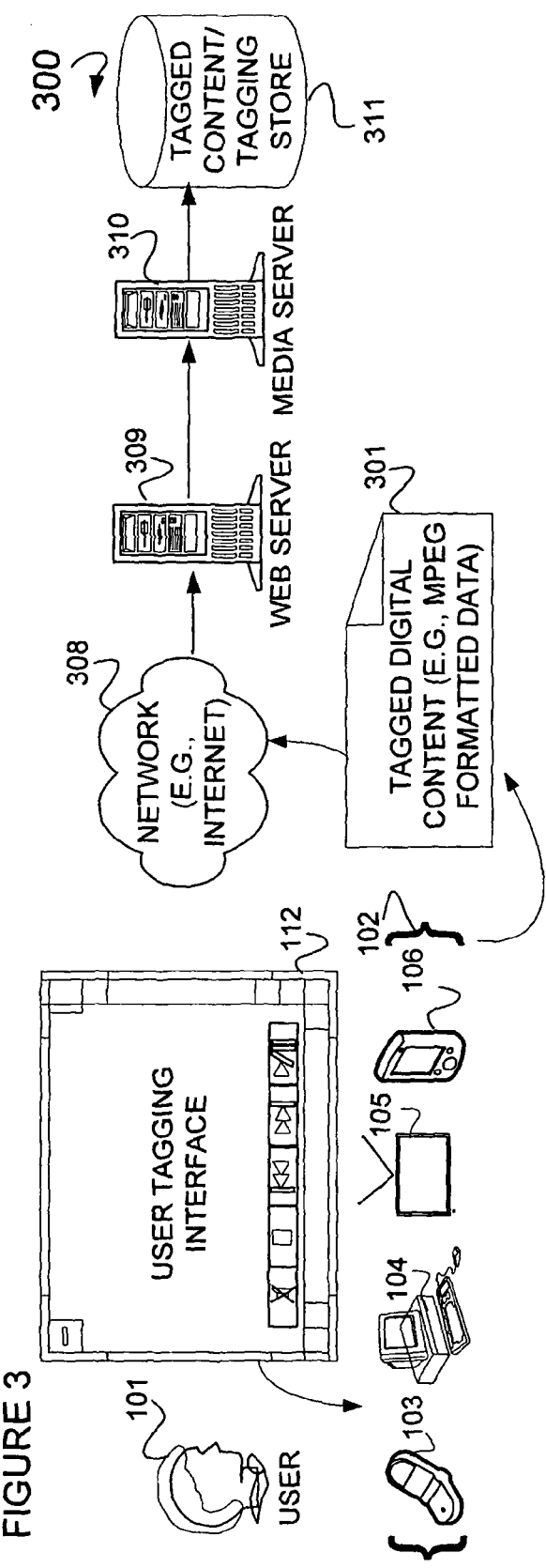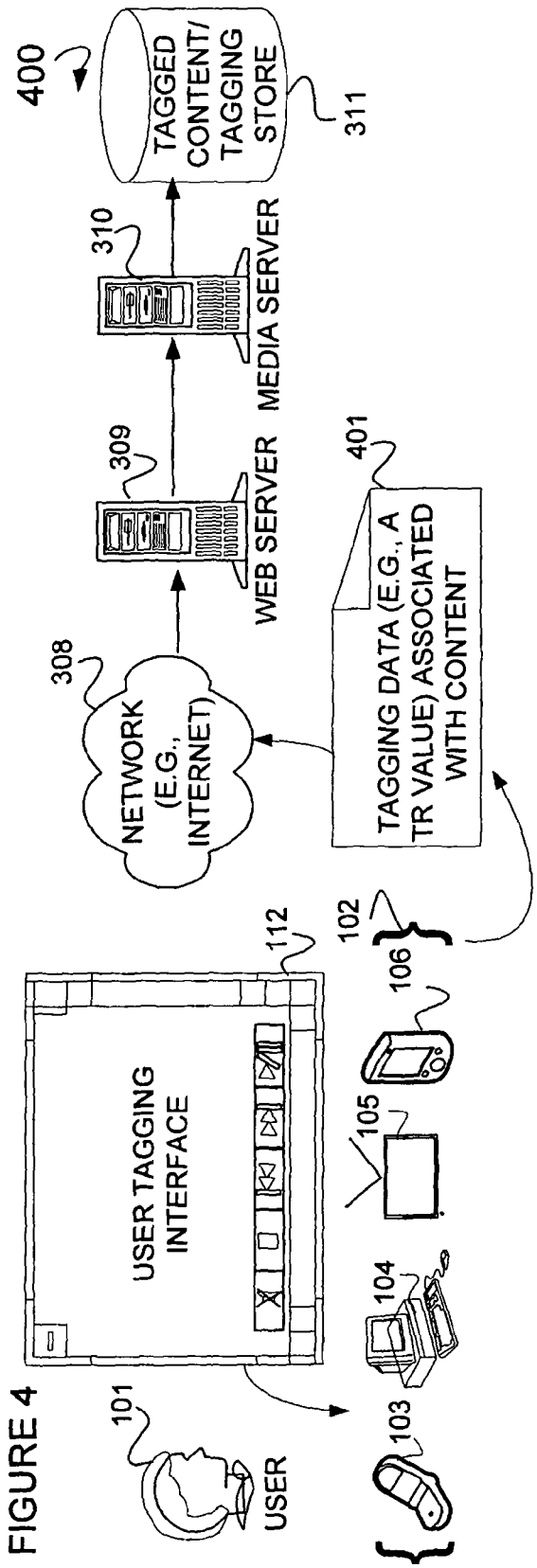

FIGURE 15
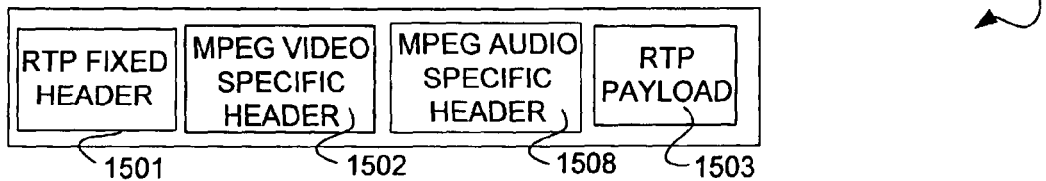
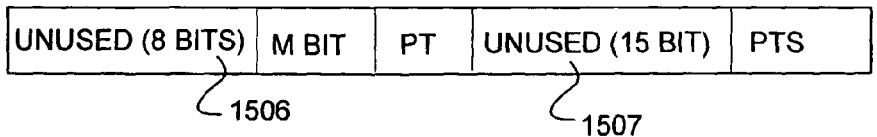
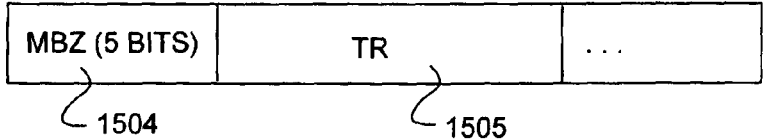
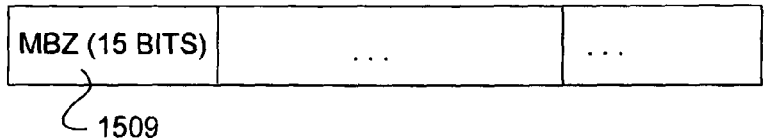
FIGURE 16
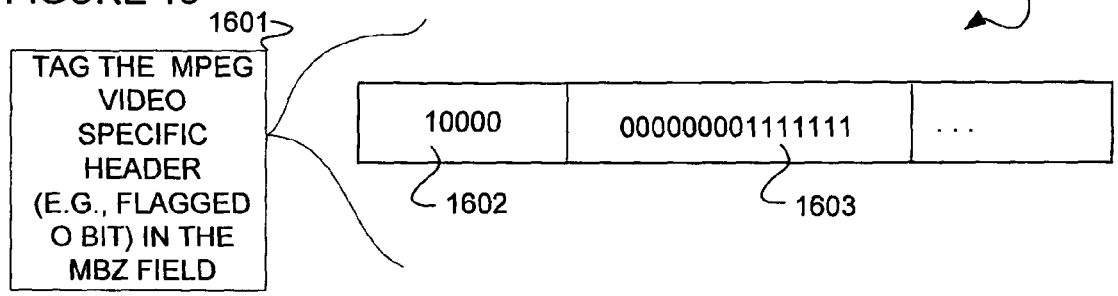
FIGURE 17
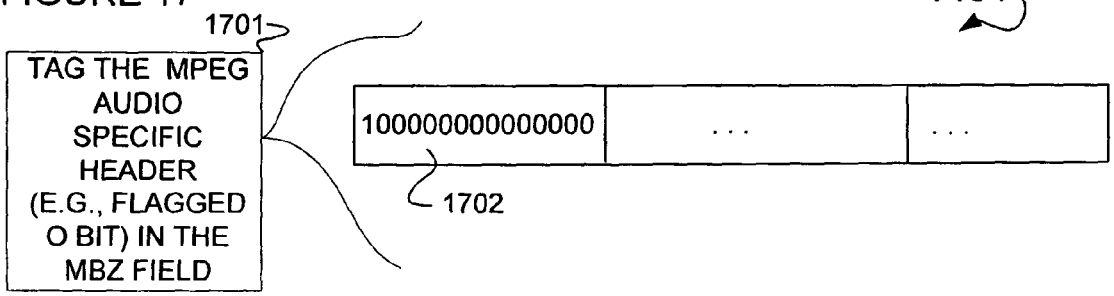

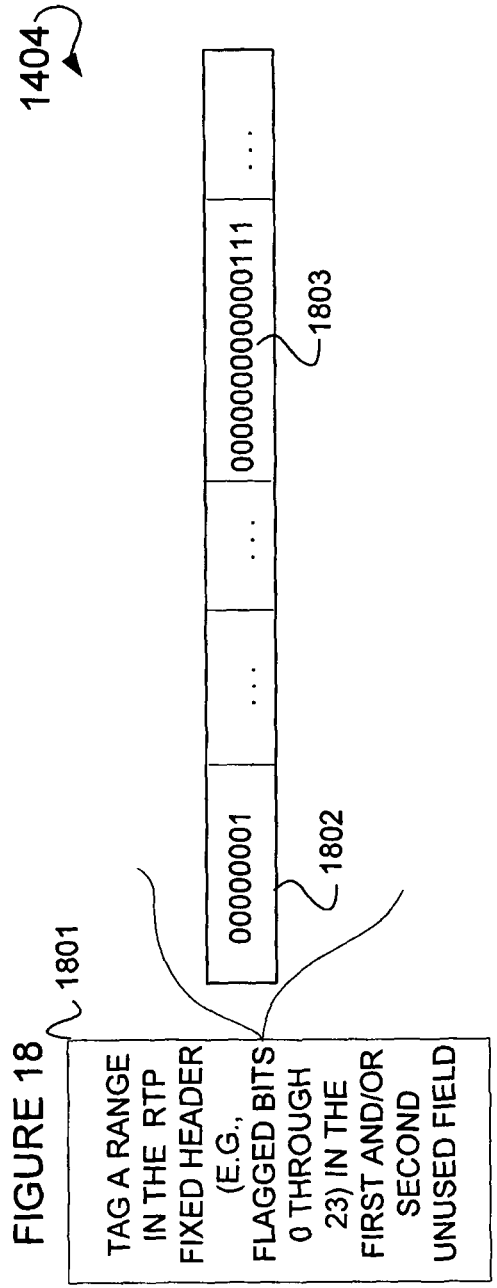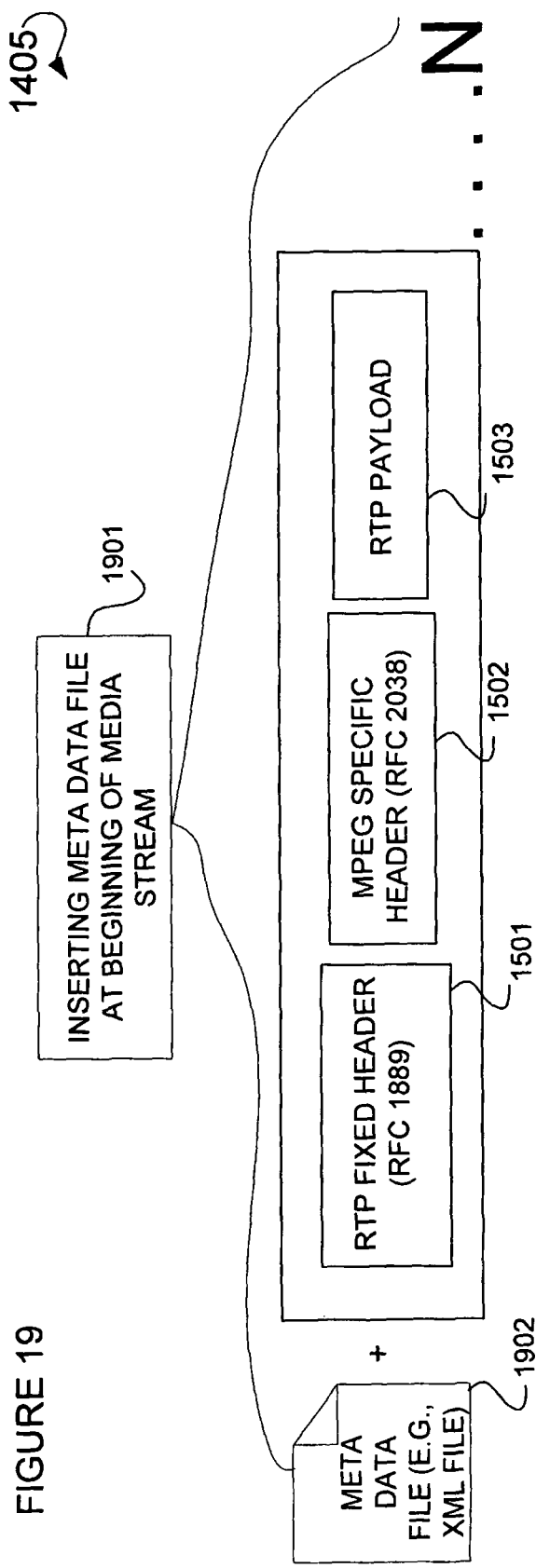

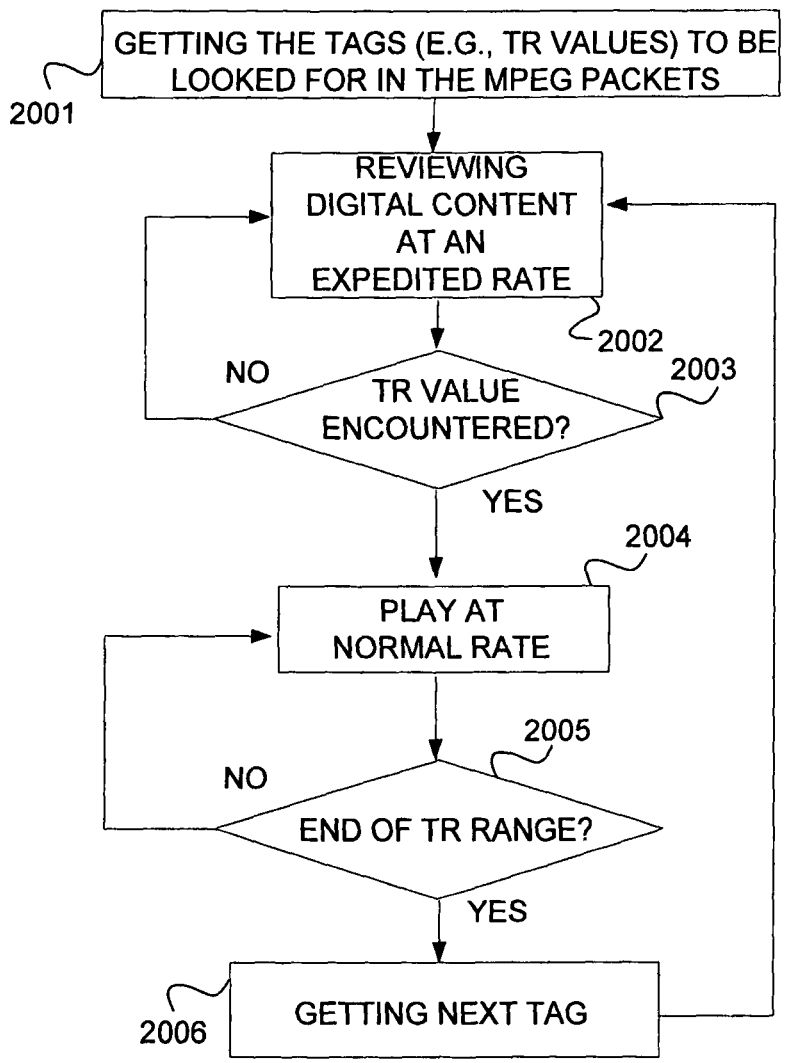

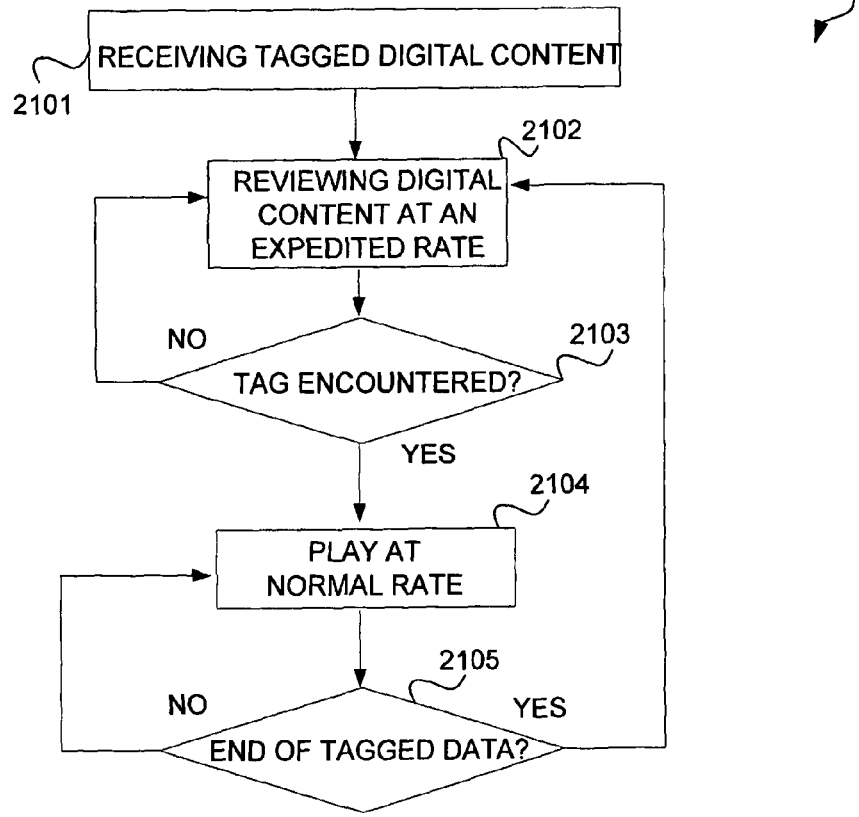
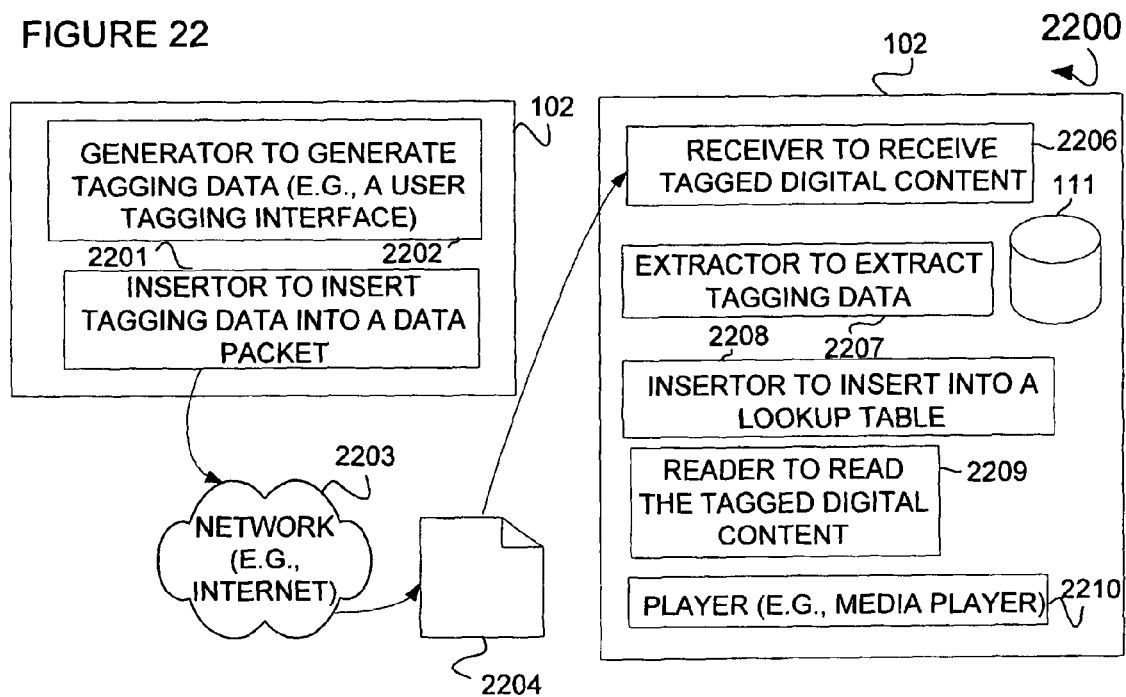

AUDIO/VIDEO CONTENT SYNCHRONIZATION AND DISPLAY

CROSS REFERENCE TO RELATED APPLICATIONS

This is a non-provisional patent application which is related to the United States Patent Application titled: "AGGREGATING CHARACTERISTIC INFORMATION FOR DIGITAL CONTENT" (application Ser. No. 11/444,642, now issued as U.S. Pat. No. 8,001,143), and to the United States Patent Application titled: "AUTOMATIC VIDEO HIGHLIGHTS USING A RATING SYSTEM" (application Ser. No. 11/669,002) both of which are incorporated by reference in their entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright ©2007, Adobe Systems Incorporated, All Rights Reserved.

TECHNICAL FIELD

The present application relates generally to the technical field of algorithms and programming and, in one specific example, to the use of indicia to tag data.

BACKGROUND

While a portion of digital content (e.g., a video and/or audio) is being reviewed using a fast-forward mode, or reverse mode, the audio associated with this digital content may not be able to be heard at its normal rate. Also, while using one of these modes, the ability to determine the specific location of certain portions of video or audio digital content is limited to certain visual or temporal cues (e.g., observing, at a high rate of Frames Per Second (FPS), video digital content that appears similar to the desired video or audio digital content).

SUMMARY

According to an embodiment, a system and method for marking or for creating tagged digital content (e.g., audio or video) is described. In some embodiments, a tag in the form of a bit flag is inserted into the field of a data packet containing digital content to denote that the data packet is to be reviewed (e.g., played by a media player application) at a normal rate during the application of a fast-forward or reverse mode. Some example embodiments may include a range of values corresponding to Temporal Reference (TR) values, frame numbers, or other values differentiating packets of digital content stored into a field of a data packet containing digital content. Still further embodiments may include a metadata file, written in, for example, an Extensible Mark Up Language (XML), inserted into the beginning of a media stream or digital content file (e.g., a Motion Picture Experts Group (MPEG) formatted media stream or digital content file) to denote which data packets of the media stream or digital content file are to be played at a normal rate during the fast-forward or reverse mode. In some cases, this mode may be a one or more methods implemented in software. In some cases, a presentation file written using a Real-Time Streaming Protocol (RTSP) may be used to instruct, for example, a media player application that the media stream or digital content file may have data packets that are to be viewed at a normal rate during a fast-forward or reverse method or mode.

Other features may be apparent from the accompanying drawings and from the detailed description that follows.

BRIEF DESCRIPTION OF THE DRAWINGS

Some embodiments are illustrated by way of example and not limitation in the figures of the accompanying drawings in which:

FIG. 1 is a diagram illustrating example system to generate tagged digital content.

FIG. 2 is a diagram of an example system to generate tagging data.

FIG. 3 is a diagram of an example system to provide tagged digital content to a remotely located server.

FIG. 4 is a diagram of an example system to provide tagging data to a remotely located server.

FIG. 15 is a schematic of an example Real-time Transport Protocol (RTP) packet format.

FIG. 16 is a diagram showing the results of an example implementation of a module that inserts the tagging data into an MPEG video specific header.

FIG. 17 is a diagram showing the results of an example implementation of the module that inserts tagging data into an MPEG audio specific header.

FIG. 18 is a diagram showing the example results of the execution of a module that inserts a range of values (e.g., tagging data values) into a RTP header.

FIG. 19 is a diagram of an example implementation of a module that creates and inserts the metadata file into the beginning of a media stream.

FIG. 20 is a flow chart describing an example method used to implement a module that plays the retrieved tagged digital content based upon a metadata file.

FIG. 21 is a flow chart describing an example method used to implement module that plays the retrieved tagged digital content based upon values contained in packet fields.

FIG. 22 is a block diagram of an example system illustrating the generation of tagging data, the insertion of this tagging data into a data packet, and the reception and playing of this tagged digital content.

DETAILED DESCRIPTION

Figure 5:
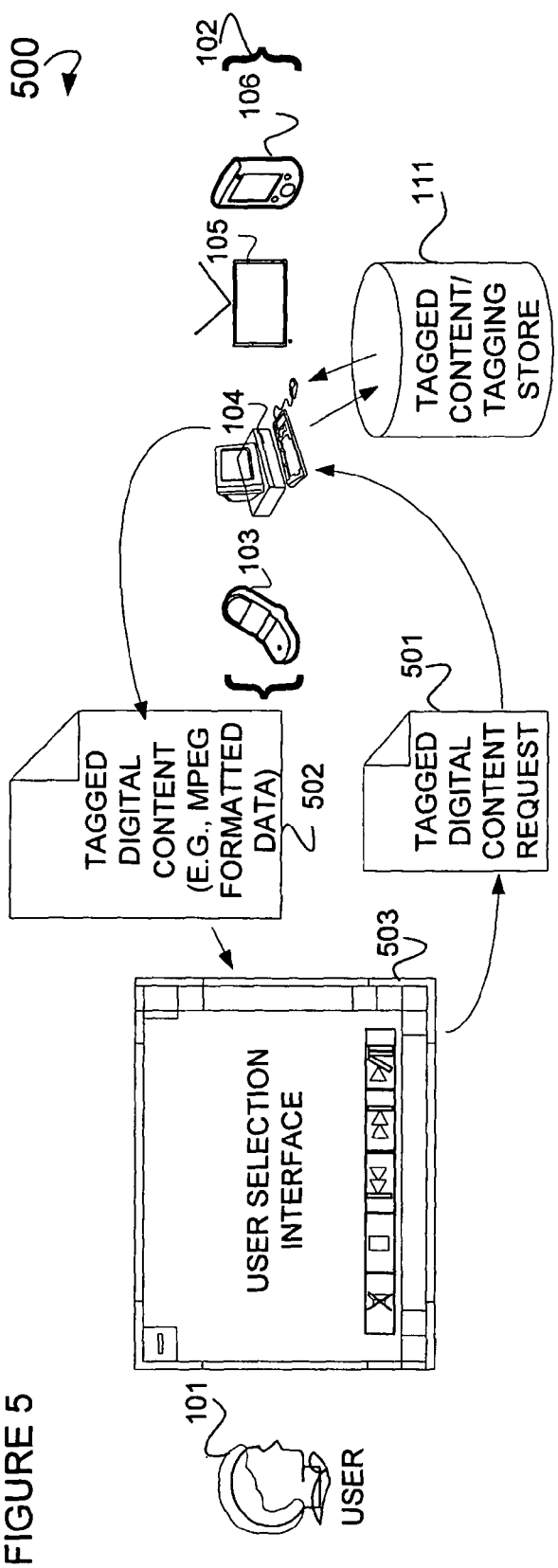
FIG. 5 is a diagram of an example system to retrieve tagged digital content.

Embodiments of methods and systems to view discrete portions of video and audio digital content during a fast-forward or reverse mode are described. In the following description, for purposes of explanation, numerous specific details are set forth to provide a thorough understanding of some embodiments. It may be evident, however, to one skilled in the art that some embodiments may be practiced without these specific details.

As used herein, the term "content" refers to electronic data that is consumed by viewers on displays, devices, automated services, print-based media, or page/display-based media. So, content may refer to data associated with readable text, data associated with graphics, data associated with images, data associated with spreadsheets, data associated with video, programmatic content, scripts, or data associated with various combinations of each or all of these. Some media may be page/display or view-based, such as World-Wide web (WWW) formatted or paged media embodied in browsers and accessible over the Internet or modified via editors. Content that is logically related to form a topic, a website, a presentation, or a publication may be referred to as a "document" or a "file."

A "portion" of content may refer to some subset of a particular digital content file. For example, a digital content file represented by an MPEG file may be broken up into discrete sections of portions wherein each portion is contiguous or non-contiguous, such that a portion of an MPEG file may be represented by MPEG data packets 1-1000, or a portion may be represented by MPEG data packets 1-70, 86-455, and 781-903. The order of these MPEG data packets is not important, and may be organized sequentially or non-sequentially.

The term "metadata" may refer to data about data or digital content such as an MPEG file. As will be more fully described below, this metadata may be stored as a metadata file that is associated with a particular portion of digital content, but not necessarily part of the digital content. The metadata may describe characteristics or attributes about digital content without actually being part of the content.

With this context, the description of various techniques and systems for generating tagging data, associating this tagging data with digital content (e.g., an MPEG file) to create tagged digital content, and playing this tagged digital content using some type of player application are now described.

A viewer of audio and/or video digital content may desire to hear and/or view certain portions of this digital content at a normal rate during a fast-forward or reverse operation. This desire may be based upon enhancing the efficiency of the viewing experience where, for example, a viewer would like subsequent viewers to be able to more efficiently review a portion of digital content (e.g., audio or video) without having to take into account certain audio or video cues. One way this efficiency may be increased is through distinguishing certain relevant digital content, in the form of data packets, from other digital content. Through distinguishing this digital content, subsequent users may be able to, for example, fast-forward through a portion of digital content and yet still be able to view and hear certain portions of this digital content deemed important by the viewer.

In some embodiments, a system is described that implements a method to insert tagging data (e.g., a tag such as a bit flag) into the bit field of a data packet used to deliver video or audio digital content. This system and method may, for example, utilize a Graphical User Interface (GUI) in the form of a user tagging interface to generate tagging data associated with the a particular portion of digital content. Once generated, this tagging data may be inserted into the digital content and stored, and/or may be stored separately from the digital content to which it relates. This user tagging interface may form the Interface level of a software application written in a three-tier architecture format. Further, this software application may manifest certain functionality similar to, for example, a media player application such as, the Adobe FLASH PLAYER™, Microsoft WINDOWS MEDIA PLAYER™, RealNetworks REALPLAYER™, or some other suitable media player application. This functionality may include the ability to generate or receive an encoded data packet, decode or encode (e.g., format the video or audio data using a codec such as MPEG) this data packet as the case may be, store the decoded data packet into a buffer, and play the buffered data packet as video and/or audio data. In some cases, these functionalities may include the initiation of a media session with a media server using RTSP and/or the downloading of a video and/or audio digital content from a remotely located web server. Further, these functionalities may include the ability to view video and audio content in a fast-forward or reverse mode. This software application may reside as a native application, while, in some embodiments, it may reside as a remote application. In some embodiments, an existing media player application may have its functionality enhanced by the method and system described herein.

Some embodiments may include a method to insert a range of values corresponding to TR values, frame numbers, or other values differentiating packets of digital content stored into a field of a data packet containing digital content. This system and method may, for example, utilize a GUI in the form of a user tagging interface to generate a range of values associated with the TR values for a particular portion of digital content. Once generated, this range of values may be inserted into the digital content and stored, and/or may be stored separately from the digital content to which it relates. This user tagging interface may form the Interface level of a software application written in a three-tier architecture format. Further, this software application may manifest certain functionality (see above) similar to, for example, a media player application such as, the Adobe FLASH PLAYER™, Microsoft WINDOWS MEDIA PLAYER™, RealNetworks REALPLAYER™, or some other suitable media player application. These functionalities may include the ability to view video and audio content in a fast-forward or reverse mode. In some embodiments, this software application may reside as a native application, while, in some embodiments, it may reside as a remote application.

Example embodiments may include a metadata file, written in, for example, an XML file, inserted into the beginning of a media stream or digital content file (e.g., an MPEG formatted media stream or digital content file) to denote which data packets of the media stream or digital content file are to be played at a normal rate during the fast-forward or reverse mode. For example, this metadata file may contain information relating to the TR value or range of TR values that are to be played at a normal rate during a fast-forward or reverse mode. This system and method may, for example, utilize a GUI in the form of a user tagging interface to generate a range of values associated with the TR values for a particular portion of digital content. Once generated, this range of values may be inserted into the digital content and stored, and/or may be stored separately from the digital content to which it relates. This user tagging interface may form the Interface level of a software application written in a three-tier architecture format. Further, this software application may manifest certain functionality (see above) similar to, for example, a media player application such as, the Adobe FLASH PLAYER™, Microsoft WINDOWS MEDIA PLAYER™, RealNetworks REALPLAYER™, or some other suitable media player application. These functionalities may include the ability to view video and audio content in a fast-forward or reverse mode. In some embodiments, this software application may reside as a native application, while, in some embodiments, it may reside as a remote application.

FIG. 1 is a diagram illustrating example system 100 to generate tagged digital content. Described is a user 101 who interacts with a user tagging interface 112. In some embodiments, this user tagging interface 112 facilitates functionality akin to a media player (e.g., a player) such as Adobe FLASH PLAYER™, Microsoft WINDOWS MEDIA PLAYER™, RealNetworks REALPLAYER™, or other suitable media players known in the art. This user tagging interface 112 (e.g., a tagging generator or generator) is used, in some cases, by the user 101 to generate tagged digital content 107. The process for generating tagged digital content will be more fully described below, but, in some cases, involves the use of an inserter to insert tags into certain fields of a data packet. This tagged digital content 107 is then stored into some type of persistent or non-persistent storage medium, such as a database 111. This user tagging interface 112 may reside on a variety of devices 102. These devices may include, for example, a cell phone 103, a computer system 104, such as a personal computer, desktop computer, laptop computer, or other suitable type of computer, a television 105, or a Personal Digital Assistant (PDA) 106. These various devices 102 may contain a database 111.

FIG. 2 is a diagram of an example system 200 to generate tagging data. Illustrated is tagging data 201 that is generated using a user tagging interface 112. This tagging data 201 is, in some cases, stored in a database 111 using one of the previously described devices 102. This tagging data may be, for example, a bit value, a TR value or range of such values, values contained in a metadata file, or some other suitable value that allows a user 101 to identify a particular portion or segment of a media stream.

In some embodiments, the digital content to be tagged is located on a device remote from the user generating the tagging data and/or metadata file. For example in some cases, a user may want to generate tagging data and/or a metadata file for a portion of digital content that is located on a media server accessed across a network connection by a user using a user tagging interface. In such circumstances, a user may, for example, generate tagging data (e.g., tags to be associated with a particular portion of digital content, and, for example, its TR values), or a metadata file and transmit this tagging data across a network to a web server and/or media server. Once received, this media server will store the tagging data into a database. In some embodiments, it will be tagged digital content itself (e.g., digital content with a tag inserted into the field of the data packets, a range of TR values inserted into the data packets fields, or a metadata file inserted into the beginning of the digital content stream or file) that is transmitted over a network connection to the web server and/or media server for storage into a database.

FIG. 3 is a diagram of an example system 300 to provide tagged digital content to a remotely located server. Illustrated is a user 101 who uses a user tagging interface 112 to generate tagged digital content 301. This tagged digital content 301, generated using one of the previously described devices 102, may be transmitted over a network 308 to, for example, a web server 309 that is operatively coupled to a media server 310. This media server 310 may, in some cases, be, in turn, operatively coupled to a persistent or non-persistent storage medium such as database 311 that stores tagged content or tagging data. As will be more fully described below, this tagged digital content may be transported across the network 308 using a variety of codec, protocols, and formats including formatting the tagged digital content using MPEG, wrapping the tagged digital content in a RTP data packet, wrapping this RTP data packet in a User Datagram Protocol (UDP) or Transmission Control Protocol (TCP) segment (depending, in some cases, on whether a media session has been established), and using anyone of a number of network protocols (e.g., Internet Protocol Version 4 or 6 (IPV4 or IPV6)) to transmit this wrapped data packet across a network. Further, as will be more fully describe below, various principles of socket programming may be implemented in an embodiment where remote access and transmission of tagged digital content or tagging data is required.

FIG. 4 is a diagram of an example system 400 to provide tagging data to a remotely located server. Described is tagging data 401 that is generated using, for example, a user tagging interface 112. Once this tagging data 401 is generated, it is transmitted over a network 308 and ultimately stored by, for example, a media server 310 into a database 311. This tagging data 401 may be in the form of a changed bit value associated with data packet field or a particular data packet, a TR value or range or TR values inserted into the data packets fields, or a metadata file inserted into the beginning of the digital content stream or file that is transmitted over a network connection to the web server 309 and/or media server 310 for storage into a database 311.

Some embodiments may include a user implementing a user selection interface to select tagged digital content located natively to the user selection interface, or located remotely from the user selection interface. In certain cases, this selection may be form a native or remote database. In response to this selection or query, tagged digital content and/or tagging data may be returned to the software application implementing the user selection interface. Further, this software application may manifest certain functionality similar to, for example, a media player application such as, the Adobe FLASH PLAYER™, Microsoft WINDOWS MEDIA PLAYER™, RealNetworks REALPLAYER™, or some other suitable media player application. Some embodiments may include the software application selecting the tagging data or tagged digital content from a web server 309 and/or media server 310.

Further, in some cases, this user selection interface may be used as apart of a player, such as a media player, to play tagged digital content at an expedited rate, to read the digital content (e.g., using a reader such as a decoder, a parser, and interpreter) looking for tagged digital content, and to play the digital content at a normal rate where a tag is read by the reader. In certain cases, this selection may be from a native or remote database. Moreover, in some cases, the user selection interface and player may reside on one or more of the devices 102, wherein the devices 102 may have a receiver to receive tagged digital content, an extractor (e.g., a extractor such as a decoder, parser and interpreter) to extract tagging data from this tagged digital content, and an inserter (e.g., a register to maintain values in persistent or non-persistent memory) to insert the extracted tagging data into a lookup table to assist with determining which data packets are to be viewed at a normal rate. In some cases, only the video portion or only the audio portion of tagged digital content, and its associated data packets, will be played at a normal rate, while in other cases both portions will be played at a normal rate.

FIG. 5 is a diagram of an example system 500 to retrieve tagged digital content. Illustrated is a user 101 who, by using a user selection interface 503, makes a request for tagged digital content. This tagged digital content request (e.g., 501) is sent via the user selection interface 503 to one of the various devices 102 and is ultimately utilized by one of these various devices 102 to retrieve the requested tagged digital content. In some cases, one of these various devices 102 will retrieve the tagged digital content from, for example, a database 111 and display it on the user selection interface 503 in response to the user 101's request 501. In some cases, this database 111 will be a native database, whereas in other embodiments this database 111 will be non-native and will be located remotely.

Figure 6:
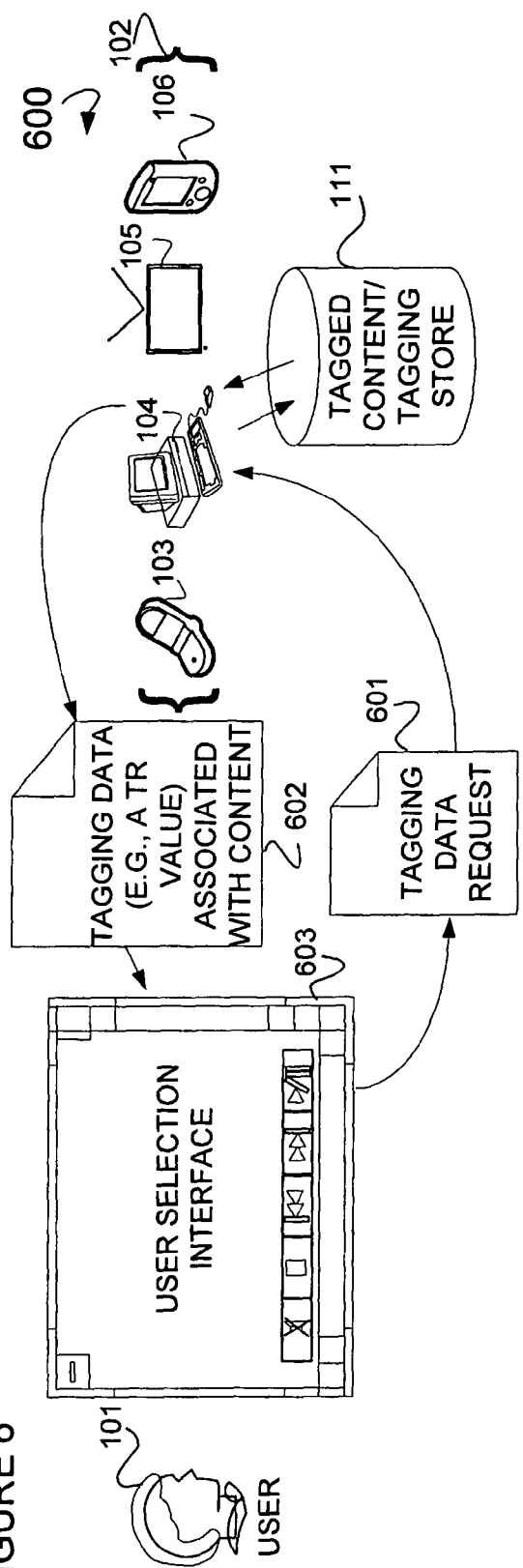
FIG. 6 is a diagram of an example system to retrieve tagging data.

FIG. 6 is a diagram of an example system 600 to retrieve tagging data. Illustrated is a tagging data request 601 that is generated using a user selection interface 603. Once the tagging data request 601 is generated via the user selection interface 603, the tagging data request 601 is sent to one of the devices 102 where one of these devices 102, in response to the tagging data request 601, provides tagging data associated with a particular portion of additional content (e.g., 602). This tagging data associated with content 602 is then displayed on the user selection interface 603. As described previously, the database 111 may be native or located remotely from the various devices 102.

Figure 7:
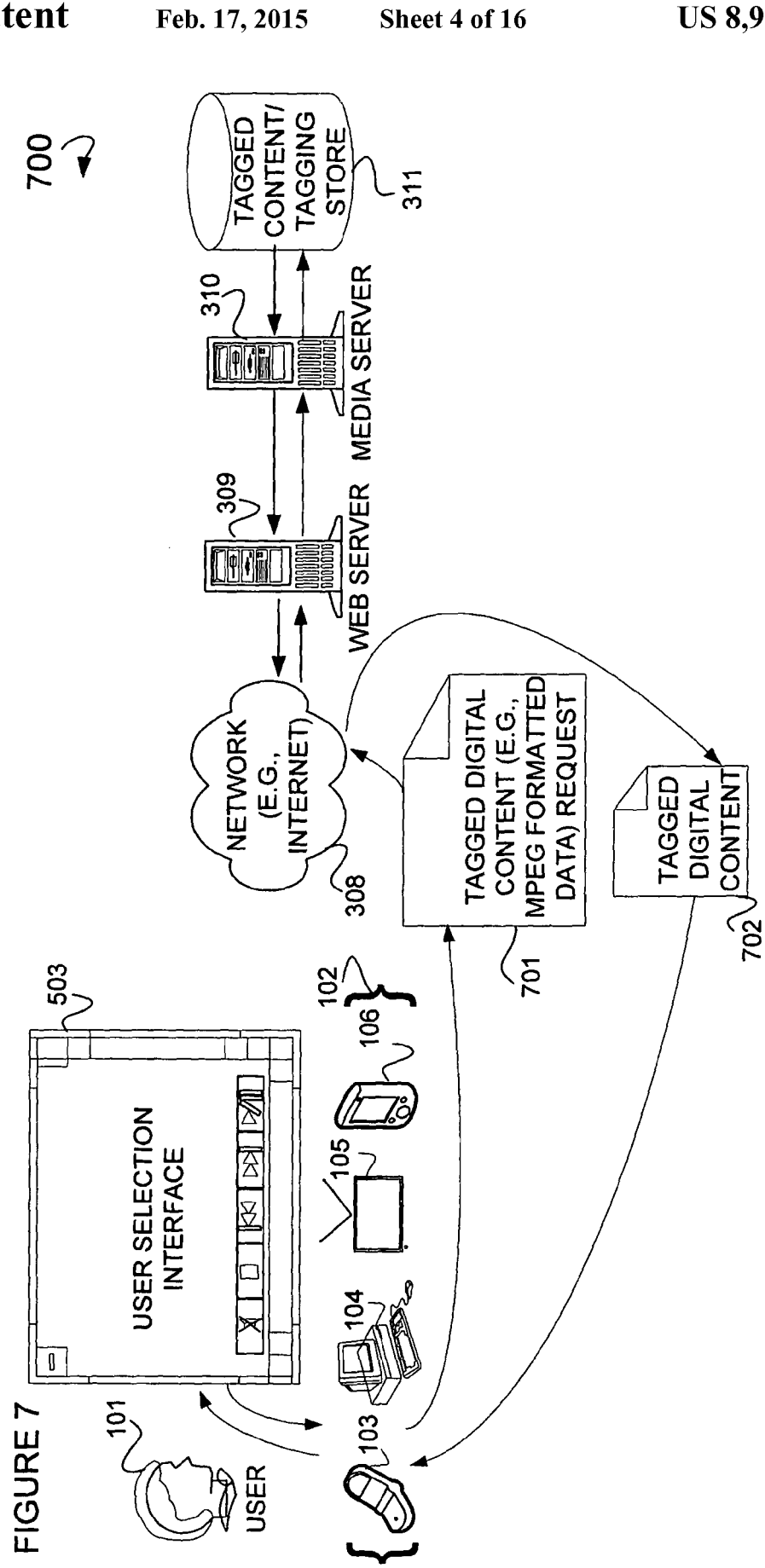
FIG. 7 is a diagram of an example system to retrieve remotely located tagged digital content.

FIG. 7 is a diagram of an example system 700 to retrieve remotely located tagged digital content. Illustrated is a user selection interface 503 residing on one of the various devices 102. This user selection interface 503 is used by a user 101 to make a tagged digital content request 701. Once this tagged digital content request 701 is made using the user selection interface 503, the request is sent over a network 308 to a web server 309 and ultimately to a database 311. In response to this tagged digital content request 701, the media server 310 will retrieve the tagged digital content 702 and transmit it over the network 308 ultimately to one of the devices 102 where it will be displayed to the user 101 via the user selection interface 503. In other cases, it is the web server 309 that will obtain the tagged digital content from the media server 310, and transmit it over the network 308 as, for example, a media stream or media file.

Figure 8:
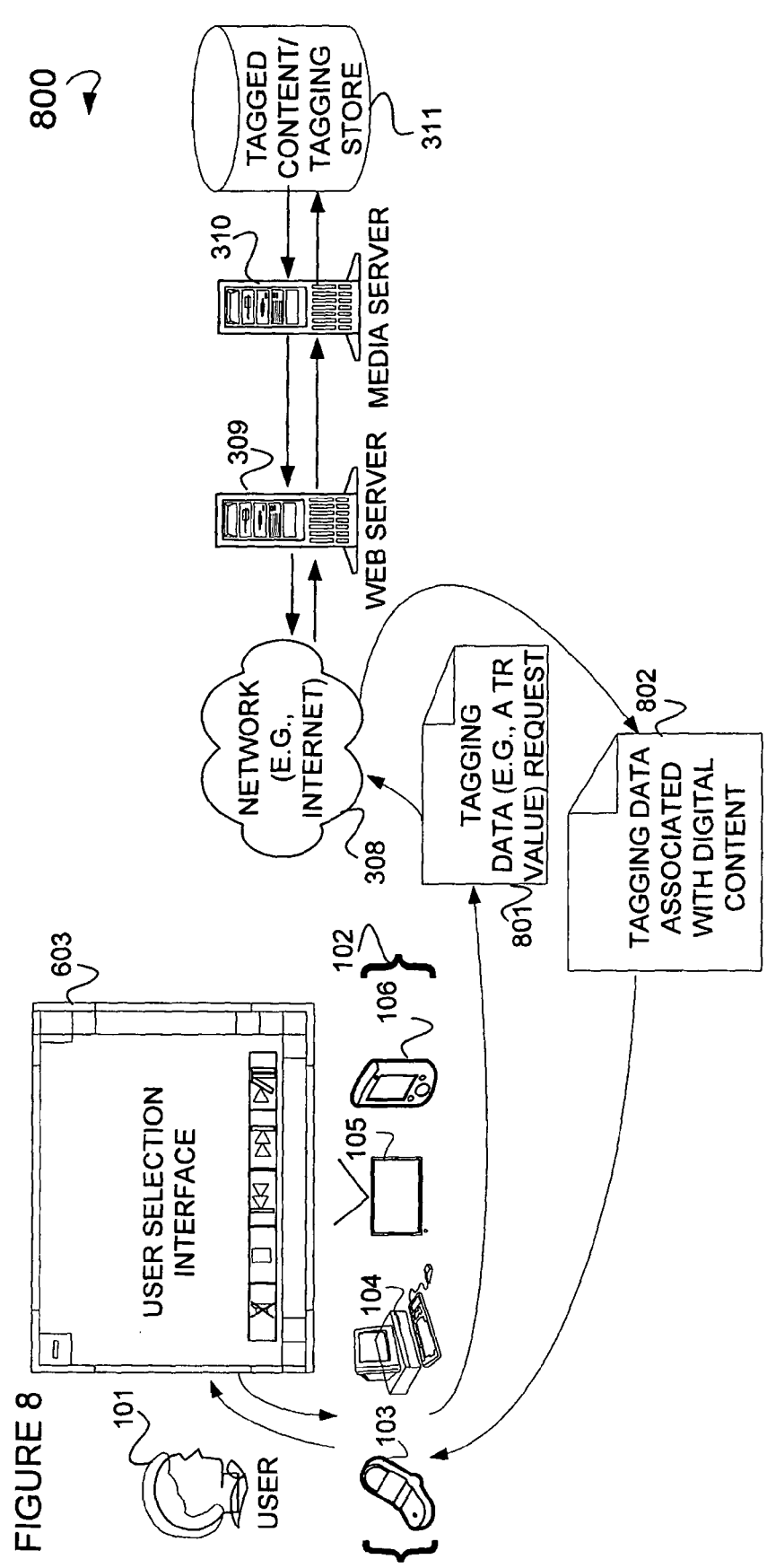
FIG. 8 is a diagram of an example system to retrieve remotely located tagging data.

FIG. 8 is a diagram of an example system 800 to retrieve remotely located tagging data. Illustrated is a user 101 using a user selection interface 603 to make a tagging data request 801. Once this tagging data request 801 is made, it is transmitted over a network 308 ultimately to a media server 310. Once received by the media server 310, the tagging data associated with the digital content 802 is transmitted by the media server 310 to, in some cases, a web server 309 and ultimately over a network 308 to one of the devices 102. In some cases, the media server 310 transmits the tagging data associated with the digital content 802 directly over the network 308 without using the web server 309. Once the tagging data associated with the content 802 is received by one of the devices 102, it is displayed on the user selection interface 603 to the user 101.

In some embodiments, audio (e.g., dialog) may be played at a normal rate during the execution of a fast-forward mode. For example, in one case, the sub-title file of an MPEG file is read so as to provide the dialog portion of a specific section of the MPEG file being played at an expedited rate. In another case, the dialog may be extracted from the MPEG file itself and played at a normal rate during the course of playing a corresponding video portion at an expedited rate. In one case, a user may chose to play a section of an MPEG file corresponding to the time T1 through T100, where T1 and T100 correspond to, for example, TR values. Once selected, using some type of user selection interface or suitable GUI, the dialog corresponding to this selected section may be played at a normal rate, while the video portion may be played at an expedited rate. This dialog may continue to be played at a normal rate until T100 is reached through using the fast-forward mode.

Moreover, in some embodiments, a series of sections, that is serial or noncontiguous in nature, can be selected and played using a fast-forward mode such that the dialog portion is played at a normal rate for each section. For example, if a user, using a user selection interface or other suitable GUI, selects T2-T100, T223-T781, and T782-T901, then the fast-forward mode may be applied to these selections and the corresponding dialogue may be played at a normal rate so long as the fast-forward mode is processing the selection. Once a different selection is processed, the dialogue from the previous section may cease to be played, and the beginning of the dialogue corresponding to next selection may be played. As previously described, this dialog may be taken from a sub-title file, or the audio portion of an MPEG file.

A Three-Tier Architecture

In some embodiments, one implementation may be as a distributed or non-distributed software application designed under a three-tier software architecture paradigm, whereby the various modules of computer code that make up the one implementation can be categorized as belonging to one or more of these tiers. A three-tier architecture is well known in the art. The first tier is an Interface level that is relatively free of application processing. The second tier is a Logic level that performs processing in the form of logical/mathematical manipulations (Logical Manipulations) of data inputted through the Interface level and communicates the results of these Logical manipulations with the Interface and/or back-end or Storage level. Some example embodiments may include these Logical Manipulations relating to certain business rules or tasks that govern the application as a whole. These logical manipulations and associated business rules may be used to tag digital content, generate tagging data for such digital content and/or generate a metadata file to be associated with the digital content. The third tier or Storage level is a persistent storage medium, or, some example embodiments may include non-persistent storage medium. One or more of these tiers may be collapsed into one another, resulting in a two-tier architecture, or one-tier architecture. For example, the Interface and Logic levels may be consolidated, or the Logic and Storage level may be consolidated, as in the case of an application with an embedded database. This three-tier architecture may be implemented using one technology, or as will be discussed below, a variety of technologies. These technologies may include one or more object-oriented programming languages such as, for example, JAVA™, C++, DELPHI™, C#, or the like. Additionally, structured programming languages such as, for example, C, may also be used. Moreover, scripting languages such as, for example, Perl, Python, PHP, JAVASCRIPT™ or VBSCRIPT™ may also be used. This three-tier architecture, and the technologies through which it is implemented can be implemented in two or more computers organized in a server-client relationship, as is well known in the art, such that an Interface level resides on a client computer, whereas a Logic level resides on the application server (see below) and the Storage level resides on a database server (see below). As will be discussed more fully below, in such a relationship these three tiers can be implemented as various software components that communicate via distributed programming protocols. Some example embodiments may include these three tiers being implemented in a peer-to-peer configuration, with centralized or decentralized file and data sharing, or some other suitable file sharing paradigm, such that all three tiers reside on one or more computers and each computer retrieves files and data from one another. Peer to peer configurations are well known in the art.

An Interface Level

An example embodiment uses a client-based browser application, whereas other embodiments may be implemented via a command line interface. Some example embodiments of a client based browser application may include an Application Programming Interface (API) implemented to allow one application to communicate with another. Some well-known client-based browser applications include NETSCAPE™, INTERNET EXPLORER™, MOZILLA FIREFOX™, OPERA™, or some other suitable browser application. Common to these browser applications is the ability to use a Hyper-Text Transfer Protocol (HTTP) or Secured Hyper-Text Transfer Protocol (HTTPS) to get, upload (e.g., PUT) or delete web pages and interpret these web pages that are written in HTML and/or XML. HTTP and HTTPS are well known in the art, as are HTML and XML. HTTP and HTTPS are used in conjunction with a Transmission Control Protocol/Internet Protocol (TCP/IP) protocol as described in the Open Systems Interconnection Reference Model (OSI) model, or the TCP protocol stack model, both of which are well known in the art. The practical purpose of the client-based browser application is to enable a user to interact with the application through the display of plain text, and/or interactive, dynamic functionality in the form of buttons, text boxes, scroll down bars or other objects, widgets contained on one or more web pages constructed using the aforementioned HTML and/or XML.

Some embodiments may include web pages that are typically static or dynamic in nature. Those that are static typically display text as one would see it on a printed, physical page. Dynamic web pages, however, are interactive and allow for a user to input data, query data, and/or modify data just to name a few of the functionalities associated with dynamic web pages. The dynamic nature of web pages is a product of the use of the other technologies in combination with HTML and/or XML.

Some example embodiments may include using Java Server Page (JSP™), or Active Server Pages (ASP™ or ASP. NET™) (collectively server pages) to provide a user with dynamic web pages or content via their web browser. Additional technology may be implemented in the form of an additional program (e.g., routine) written in another programming language that is embedded into the HTML and/or XML code, allowing for web pages to become dynamic. Some of these additional technologies include, for example, embedded routines written in the Java programming language, the JAVASCRIPT™ language, or the VBSCRIPT™ programming language, or some other suitable programming language. These embedded routines are used to execute the aforementioned HTTP, and/or HTTPS requests (e.g., GET, PUT, and DELETE) for web pages. In some embodiments, asynchronous webpage access is provided using JAVASCRIPT™ in combination with XML (collectively known as AJAX). For example, a web page or server page may allow a user to make tagging data, or to get tagging data, or even to retrieve tagged digital content.

Some example embodiments may include, for example, a GUI used and implemented via a Java Servlet, Applet, or VBSCRIPT™ or C# form, or some other suitable programming language. This form may reside on one or more of the devices 102 as a client application. Moreover, this form may contain objects such as text boxes, buttons, scroll-down bars, widgets, or some other suitable dynamic interface object. These objects, and the routines governing them, allow a user to retrieve, input, or delete content, just to name few of the functions. For example, a form may allow a user to generate tagging data, or even to review digital content in at normal rate or fast forward or reverse speeds.

Figure 9:
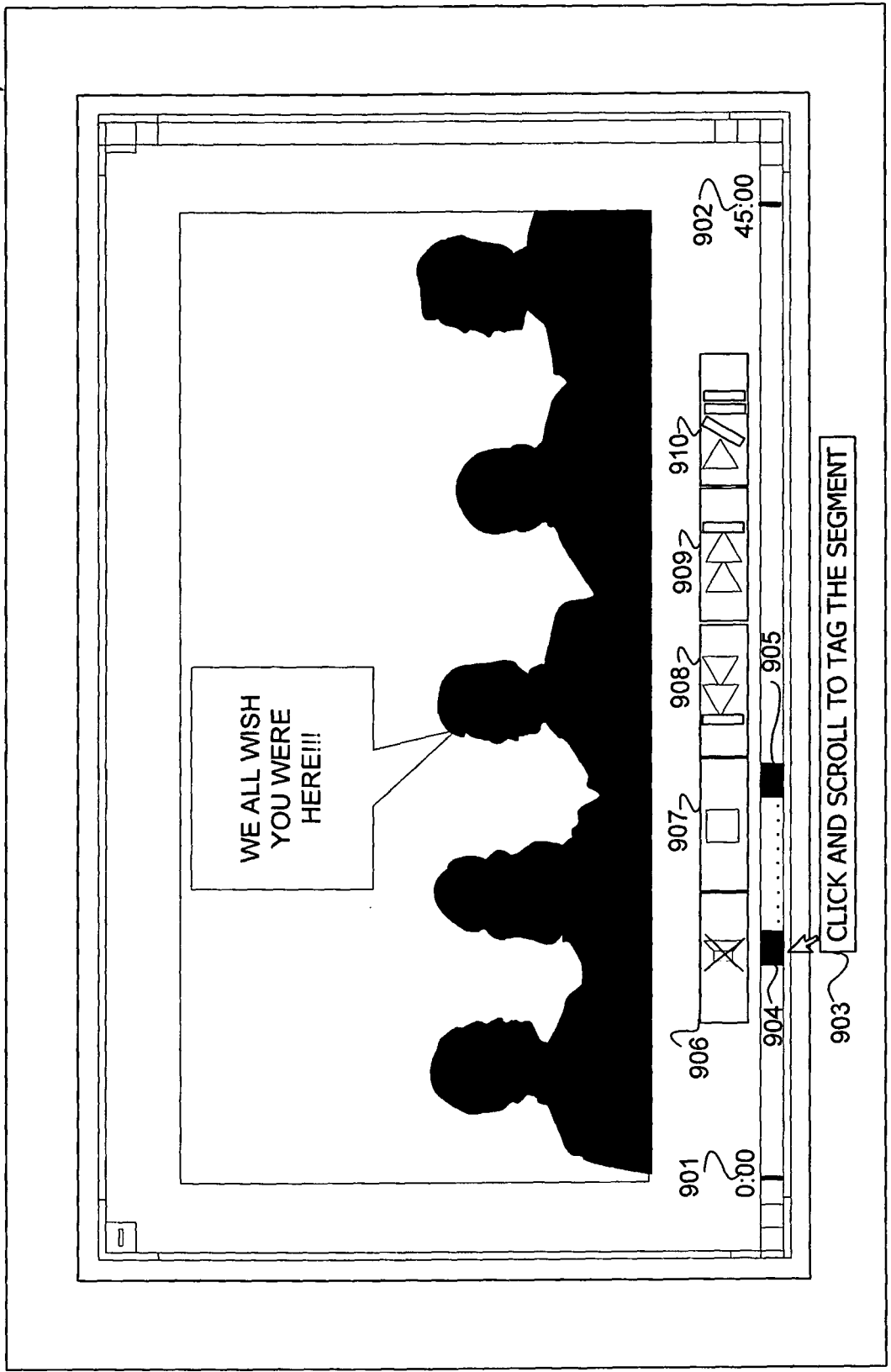
FIG. 9 is an example user tagging interface.

FIG. 9 is an example user tagging interface 112. Illustrated is the start time value 901 of 0:00 and an end time value 902 of 45:00. This start time and end time represent the length in, for example, minutes of a particular portion of digital content. Also described is a scroll button 904 that may be used by, for example, a user 101 to scroll or move along the length, or series, of frames of a particular media stream. Here button 904 is moved from a first position to a second position denoted by 905. In some cases, the purpose of using the scroll button is to tag or mark all digital content associated with the range existing between the first position at 904 and the second position at 905. In some embodiments, a user 101 may click on the first position 904 and then scroll and unclick at the second position 905, thus tagging or marking all of the digital content, frames, and/or media stream existing between these two positions. Also illustrated is a media control bar 906. Described in the media control bar are various screen object or widgets that allow a user (e.g., user 101) to play digital content at a normal rate (see e.g., button 910), play the digital content at a fast-forward speed (see e.g., button 909), play the digital content in reverse (see e.g., button 908), or to stop playing the digital content (see e.g. 907). In some embodiments, this media control bar 906 may generate commands that may be transmitted using RTSP to a remote server to retrieve digital content. Some embodiments may include the media control bar 906 generating commands to obtain natively located content.

Figure 10:
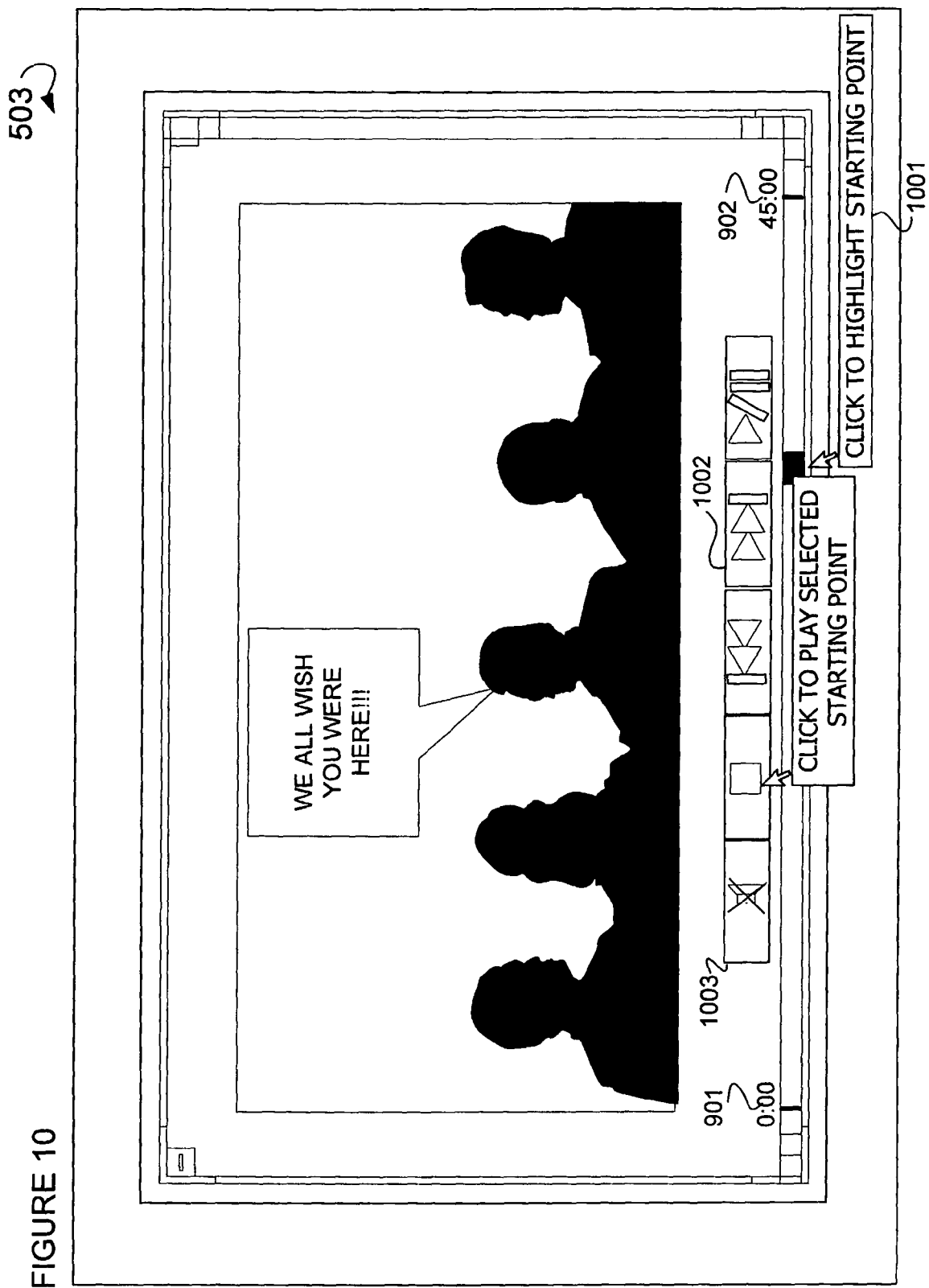
FIG. 10 is an example user selection interface.

FIG. 10 is an example user selection interface 503. Illustrated is a first position 1001 wherein a user, such as user 101, selects the beginning point of a particular portion of digital content for viewing. Once selected, the user 101 may select a fast-forward button 1002 that may exist as a part of a media control bar 1003. Once the fast forward button 1002 is selected, the media stream may begin to play at an expedited rate based upon the invocation of a fast-forward mode. In some embodiments, this may continue until a tagging data value is encountered as a part of the media stream. Further, in some embodiments, this playing at an expedited rate may continue until a certain TR value is encountered. Where either the tag value or a certain TR value is encountered, in some embodiments, the media stream may play at a normal or non-expedited rate. This normal or non-expedited rate of play may continue so long as tagging data or certain TR values continued to be encountered.

Figure 11:
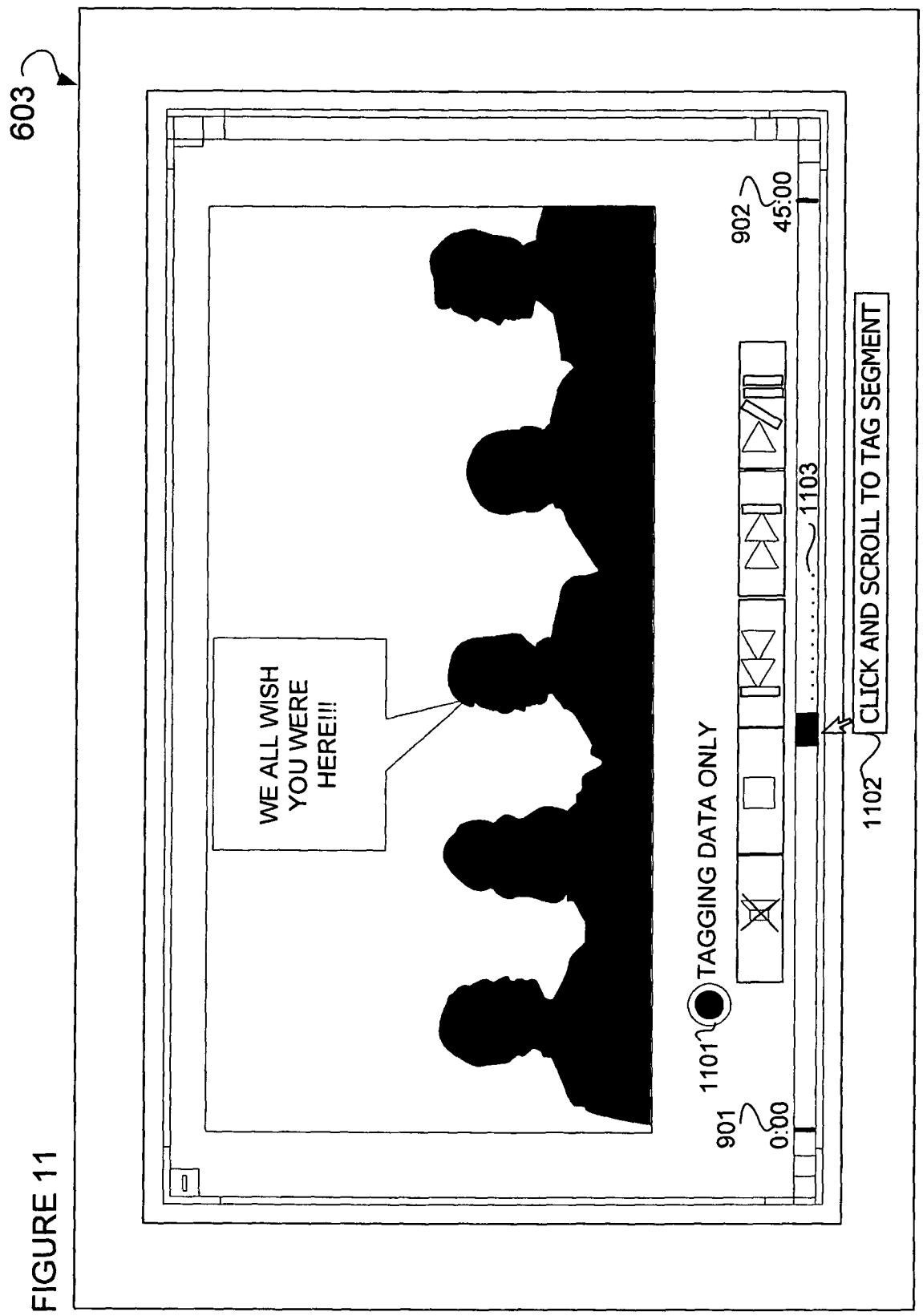
FIG. 11 is an example user selection interface for tagging data only.

FIG. 11 is an example user selection interface 603. Illustrated is a radio button 1101 used to make the tagging data only selection. In some cases a user, such as user 101, may only require the generation of tagging data, as opposed to the actual insertion of this tagging data into a portion of digital content. In those instances where only tagging data need be generated, the user 101 may select the radio button 1101 for the purposes of receiving only tagging data. In some cases, this tagging data may be a stream of data denoting various TR values associated with a particular portion of digital content. Once the radio button 1101 is selected, a user, such as user 101, may click on or use some other type of GUI based interface to select a particular portion of a media stream. Here the user selects a start position denoted by the position of the scroll button 1102, and moves this scroll button 1102 along the range of the media stream for which tagging data is to be generated (see e.g., 1103).

Logic Level

Some example embodiments may include the above described GUIs (e.g., user tagging interface 112 and user selection interface 503 and 603) being implemented via web pages, and/or server pages that are stored on one or more remote server computers connected to a client device (e.g., one or more of the devices 102) via an network connection. These remote servers can be a web server 309 and/or application server. web servers running JSP™ can include the APACHE™/APACHE TOMCAT™ web server. web servers running ASP™ can include a Microsoft WINDOW WEB SERVER 2003™ utilizing Internet Information Services (IIS). Application servers running JSP™ can include the Orion Application Server or other J2EE™ certified application servers. Application servers running ASP™ can include WINDOWS SERVER 2003™. For example, a web server 309 may serve a web page over a network, a web page that allows a user to generate tagging data and/or insert this data into a media stream or portion of digital content. In some cases, this web page has an interface similar to those described above (e.g., 112, 503 and/or 603). This tagging data or tagged digital content may then be passed to an application server for storage or further processing.

In some embodiments, the Logic level may be governed by a rule set written in a scripting language that controls how and when certain web pages, server pages, or portions of content are provided to, or made accessible to, a particular user. This scripting language can be in the form of Java, Perl, Python, or some other general purpose scripting language. For example, once the logic of a JSP™ determines that a particular object (e.g., a scroll bar) on a web page has been executed (e.g., tagging data has been generated that corresponds to a portion of digital content or a media stream), the data from this object is inputted, and sent to a web and/or application server. Some example embodiments may further include a routine written in a scripting language to retrieve data from a storage (e.g., database 311), data structure, or Storage level. The Storage level may be run by a separate database application, while, in other embodiments, a database embedded with a Logic level may be implemented (e.g., a native database such as database 111).

In some embodiments, a client software application may be written that may include the above described GUIs (e.g., user tagging interface 112 and user selection interface 503 and 603). This application may be written using a form such as a C# form. In contrast to a screen objects and widgets existing as a part of a web page displayed using a web browser, client application, and its respective objects and widgets may perform functionality similar to that of the screen objects and widgets associated with a web page. For example, a C# form may take in data (e.g., the selection of a portion of a media stream for tagging) from a user 101 and pass it to one of the above described web and/or application servers. Once passed to one of these servers via a network connection, various methods as described below may be applied to the data.

Figure 12:
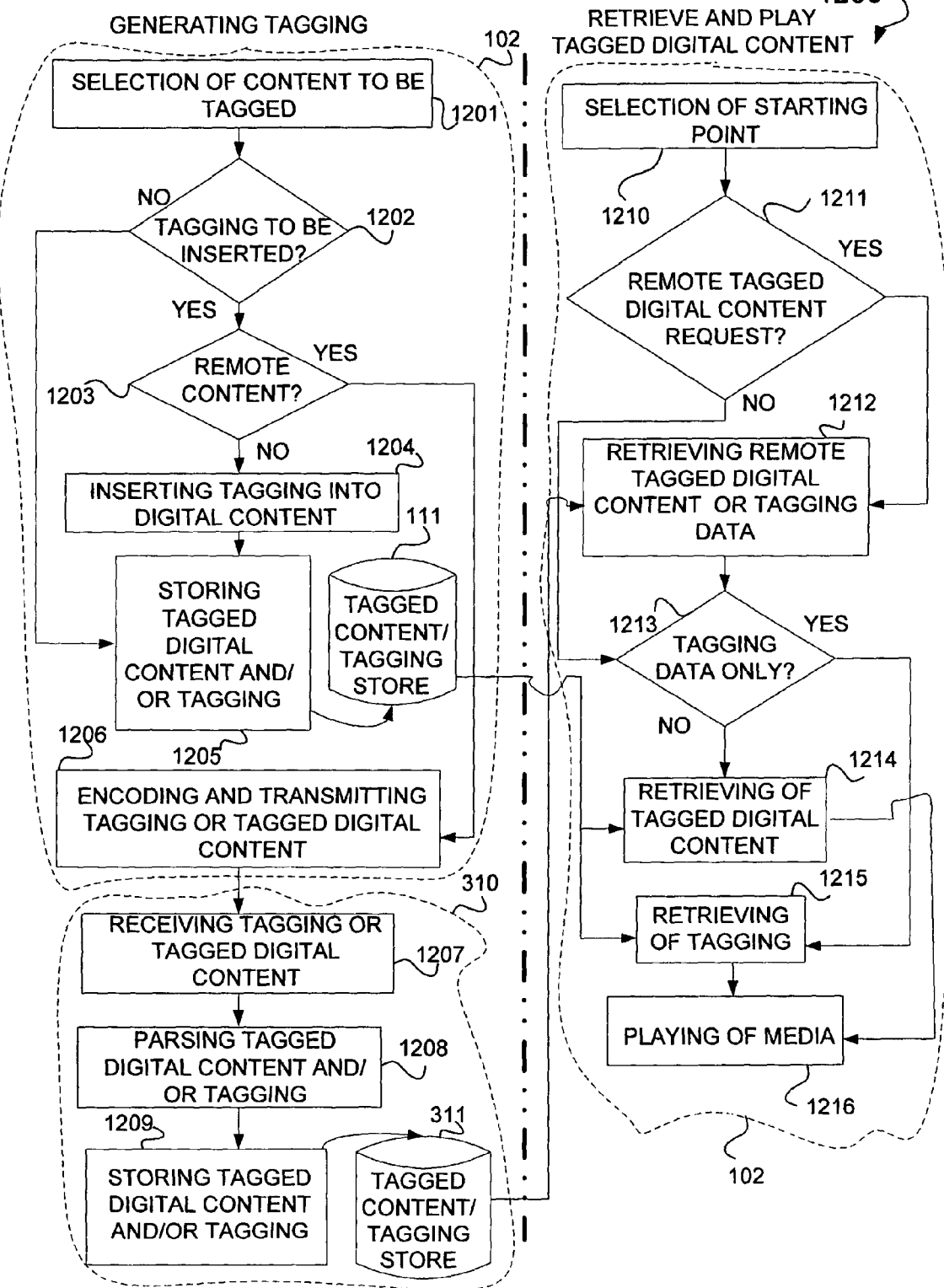
FIG. 12 is a dual stream flow chart describing example method to create tagged digital content.

FIG. 12 is a dual stream flow chart describing example method 1200. Illustrated is a first stream titled "Generating Tagging" and a second stream titled "Retrieve and Play Tag Digital Content." With regard to the first stream, a variety of modules (e.g., modules 1201-1206) are illustrated as residing on one of the various devices 102. For example, a module 1201 is described that allows a user, such as user 101, to generate tagging data using, for example, a user tagging interface 112. Once this tagging data is generated, a decisional module 1202 is implemented that determines whether or not the tagging is to be inserted into a particular portion of digital content. Where the decisional module 1202 evaluates to "true" (e.g., "yes"), a second decisional module 1203 is implemented to determine whether or not the digital content is located remotely from the device being used to generate the tagging data. In cases where the decisional module 1203 evaluates to "false" (e.g., "no"), a module 1204 is implemented that inserts the tagging data into a particular portion of digital content. In cases where decisional module 1203 evaluates to "true", a module 1206 is implemented. This module 1206 may be encode and transmit tagging data and/or tagged digital content. In cases where decisional module 1202 evaluates to "false", a module 1205 is implemented that stores the tagged digital content or tagging data into a database 111.

In some embodiments, these various modules 1201-1206 may be located on a web server 309, and/or media server 310 and the functionality of each module implemented by the web server 309, media server 310 and/or one or more of the devices 102. For example, as described above, a web page served by a web server 309 may contain screen objects or widgets (e.g., a scroll bar) that allows for the selection of content to be tagged (see module 1201). Once the content is selected, than the modules 1202-1206 may be executed. These modules may be written using certain principles of socket based or component based programming so as to identify these modules when they are located remotely.

Additionally described in FIG. 12 under the generating tagging stream are various modules residing on, for example, the media server 310. These various modules include modules 1207-1209. In some cases a module 1207 is implemented that receives encoded tagging data or tagged digital content. This tagging data or tagged digital content is transmitted from, for example, a device 102 over a network 308 to the media server 310. In some cases, a web server 309 may act as an intermediary between the media server 310 and one of the devices 102. Whereas in other cases, this web server 309 may not exist as an intermediary between the media server 310 and one of the devices 102. Once the encoded tagging data or tagged digital content is received using the module 1207, a module 1208 is implemented that parses the tagging data or tagged digital content and passes this parsed data to a module 1209 that stores this parsed tagging data or tagged digital content into the previously described database 311.

Further, illustrated in FIG. 12 is a second stream titled "Receive and Play Tagged Digital Content" that describes a variety of modules (e.g., 1210-1216) residing on one of the devices 102. In some embodiments, a module 1210 is implemented to select a starting point in a media stream where the media stream may be viewed (see e.g., user selection interface 503). Once this selection is made, a decisional module 1211 is implemented that determines whether or not the digital content is located remotely. Where decisional module 1211 evaluates to "true", a module 1212 is implemented that retrieves the remotely stored tagging data or tagged digital content residing on, for example, a media server 310. This retrieving may be by way of, for example, a remote Structured Query Language (SQL) call, and may involve the actual extracting or parsing of the retrieved data. In cases where decisional module 1211 evaluates to "false", a second decisional module 1213 is implemented that determines whether or not only tagging data has been requested. In cases where decisional module 1213 evaluates to "false", a further module 1214 is implemented that retrieves tagged digital content from the database 111, and provided to the module 1216 for playing. In cases where decisional module 1213 evaluates to "true", a module 1215 is implemented that retrieves only tagging data. Once module 1214 is executed, then a module 1216 is implemented that actually plays the retrieved tagged digital content. In cases where the module 1215 is implemented, then tagging data is provided to the module 1216 for the purposes of being used to play certain portions of a media stream as denoted by the tagging data supplied by the module 1215.

Some embodiments may include receiving tagged digital content at a device such as one of the devices 102, extracting the tagging data from this tagged digital content, and inserting the tagging data into a lookup table to be used to determine which data packets are entitled to be viewed at the normal rate. In such an embodiment, module 1212 may act to extract the tagging data by parsing the tagging data based upon some grammar dictated by, for example, a protocol. Once extracted, the tagging data may be placed into a lookup table such that where a user 101 selects a particular potions of the tagged digital content for viewing, a lookup of every packet, and, for example, the TR value contained therein, will occur (see e.g., module 1216 and decisional module 2003 described below) to determine whether the packet is entitled to viewing at a normal rate.

Some embodiments may include a method including generating tagging data (e.g., applying module 1201) using a computer system (e.g., one of the devices 102) to tag certain portions of digital content for playing at a normal rate as tagged digital content, wherein the playing is conducted by a media player reading the portions of digital content at a certain number of FPS considered to be the normal rate, and inserting the tagging data into a field of a data packet, that is a part of the certain portions of digital content, to create tagged digital content. Further, this method may include receiving tagged digital content (e.g., 107, or 301) at a device, extracting the tagging data (e.g., 201) from this tagged digital content, and inserting the tagging data into a lookup table to be used to determine which of the data packets are to be viewed at the normal rate. Additionally, the method may further include playing the tagged digital content at an expedited rate, wherein the playing is conducted by the media player (e.g., a media player residing on one of the devices 102) reading the portions of the tagged digital content at a certain number of FPS considered to be the expedited rate, reading the tagged digital content to determine whether a specific TR value has been encountered, and playing the tagged digital content at the normal rate, where a specific TR value is encountered, wherein the tagging data is one of a group of data types selected from the group consisting of a bit flag, and a range of TR values, and the data packet contains a header type that is selected from the group of header types consisting of a RTP header, a MPEG video specific header, and a MPEG audio specific header. In addition, the method may include storing the tagged digital content and/or tagging data into a database (e.g., database 111).

In some embodiments, a method is described as including generating a metadata file using a computer system to denote certain portions of digital content for playing at a normal rate (see e.g., module 1204), wherein the playing is conducted by a media player (e.g., that resides on one of the devices 102) reading the portions of digital content at a certain number of FPS considered to be the normal rate, and inserting the metadata file into a media stream containing the certain portions of digital content. Additionally, the method further includes receiving the media stream at a device (e.g., devices 102), reading the TR values in the metadata file to determine which portions of the digital content are to be played at the normal rate, extracting TR values from the metadata file, and inserting the TR values into a lookup table. Additionally, this method may include playing the media stream at an expedited rate, wherein the playing is conducted by a media player reading portions of the digital content at a certain number of FPS considered to be the expedited rate, reading both the metadata file and the certain portions of digital content contained within the media stream, and comparing the TR values contained within this metadata file to TR values contained in the certain portions of digital content, and playing the media stream at the normal rate, where there is a correspondence between the TR values in the metadata file and the TR values contained in the certain portions of digital content contained in the media stream. Moreover, the method may further include playing only an audio portion of the media stream at a normal rate, where a specific TR value is encountered. In addition, the method may include playing only a video portion of the media stream at a normal rate, where a specific TR value is encountered.

Some embodiments may include a computer-readable medium (e.g., some type of persistent or non-persistent storage) embodying instructions, the instructions including a first set of instructions to generate tagging data using a computer system to tag certain portions of digital content for playing at a normal rate as tagged digital content, wherein the playing is conducted by a media player reading the portions of digital content at a certain number of Frames Per Second (FPS) considered to be the normal rate, and a second set of instructions to insert the tagging data into a field of a data packet, that is apart of the certain portion of digital content, to create tagged digital content. These instructions may be written in one or more object-oriented programming languages such as, for example, JAVA™, C++, DELPHI™, C#, or other suitable programming language.

Example Case: Insertion of Tagging Data into a Data Packet

Figure 13:
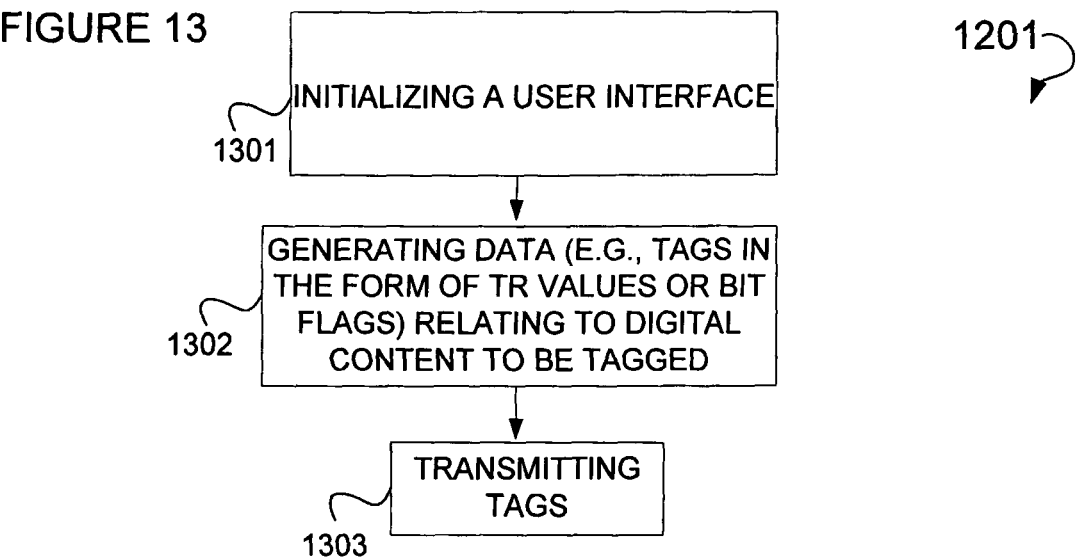
FIG. 13 is a flow chart illustrating an example method to implement module to generate tagging data.

FIG. 13 is a flow chart illustrating an example method to implement module 1201. Illustrated is a module 1301 that initializes a user interface such that tagging data may be generated. Initialization may include, for example, generating various data structures (e.g., a stack, list, queue, heap, or other suitable data structure) to temporarily hold a user 101's tagging data. Once initialization occurs, a module 1302 is implemented that generates data relating to the digital content to be tagged. For example, certain types of tagging data in the form of TR values or bit flag values may be generated. Once this tagging data is generated, then a module 1303 is executed that transmits these tags.

Figure 14:
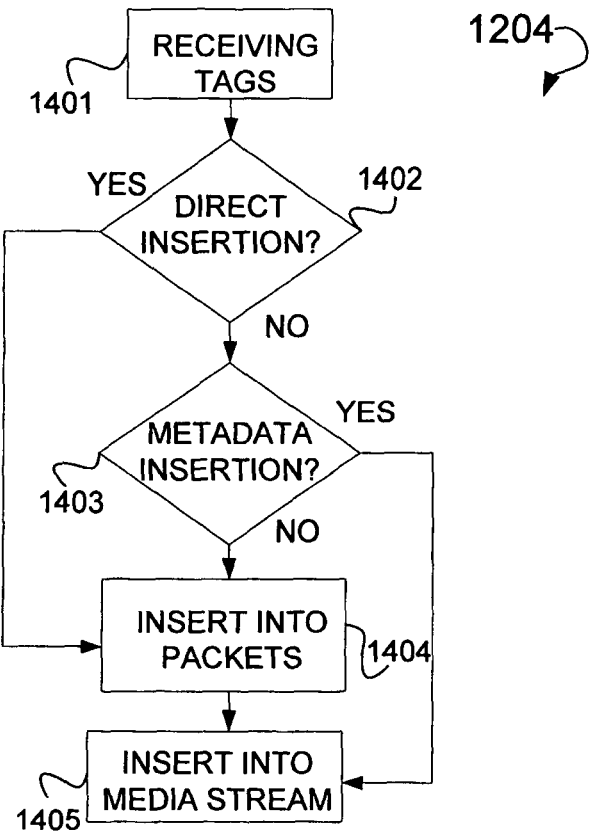
FIG. 14 is a flow chart depicting an example method to implement a module that facilitates the insertion of the tagging data into a particular portion of digital content.

FIG. 14 is a flow chart depicting an example method to implement module 1204. Described is a module 1401 that receives tagging data. Once received, the decisional module 1402 is implemented that determines whether or not this tagging data is to be directly inserted into the field of a media stream data packet. In cases where decisional module 1202 evaluates to "true", the module 1404 is executed that actually inserts the tagging data directly into the media stream data packets. In cases where decisional module 1402 evaluates to "false", a second decisional module 1403 is executed that determines whether or not a metadata file is to be inserted into a media stream. In cases where decisional module 1403 evaluates to "true", a module 1405 is executed that creates and inserts the metadata file into the beginning of a media stream. In some embodiments, this metadata file is an XML, flat file, or some other suitable file type. In cases where decisional module 1403 evaluates to "false", then tagging data is inserted directly into the media stream data packets utilizing the previously described module 1404.

FIG. 15 is a schematic of an example RTP packet format 1500. This RTP packet format 1500 contains an RTP fixed header 1501, a MPEG video specific header 1502, and MPEG audio specific header 1508. Further described, is an RTP payload 1503 containing the actual digital content to be viewed and/or listened to using, for example, the method described herein. With regard to the MPEG specific header 1502, various subfields make up this MPEG video specific header 1502, including a MBZ, or must be zero field 1504 that is 5 bits in size, and a TR field 1505. As to the MPEG audio specific header 1508, a number of subfields make up this header including an MBZ field 1509 that is 15 bits in size. Regarding the RTP fixed header 1501, various subfields are used to make up this header, including an unused field 1506 that is 8 bits in size, and a second unused field 1507 that is 15 bits in size.

FIG. 16 is a diagram showing the results of an example implementation of the module 1404. Illustrated is a module 1601 that tags an MPEG specific video header by flagging a bit position within this header. For example, described is a field 1602 of an MPEG video specific header wherein the 0-bit position has been flagged or otherwise tagged as previously described. Also illustrated is a TR field 1603 containing a TR value. In some embodiments, some other suitable bit position is flagged including the 1, 2, 3, 4, and/or 5-bit position.

FIG. 17 is a diagram showing the results of an example implementation of the module 1404. Illustrated is a module 1701 that tags an MPEG specific audio header by flagging a bit position within this header. For example, described is a field 1702 of an MPEG audio specific header wherein the 0-bit position has been flagged, or otherwise tagged as previously described. In some embodiments, some other suitable bit position is flagged including the 1, 2, 3, 4, 5, 6, 7, 8, 9, 10, 11, 12, 13, and/or 14-bit position.

FIG. 18 is a diagram showing the example results of the execution of a module 1404. Described is a module 1801 that sets a range of tag values (e.g., tagging data values) corresponding to various TR values that are a part of a particular portion of digital content or a media stream. Described is an RTP fixed header with a field 1802 containing the value of 1 represented as 00000001 binary. Also described is a second field 1803 that corresponds to the second unused field of the RTP fixed header containing a value of 7 represented as 000000000000111 binary. While the range, as illustrated herein, is shown over two data fields, in some embodiments, the field 1802 may contain values ranging from 1 to 255 (e.g., 00000001 to 11111111 binary), while the values in field 1803 may be 1 to 32767 (000000000000001 to 111111111111111) that are concatenated together such that a TR value or values in the range of 1 to 8388607 (e.g., 00000000000000000000001 to 11111111111111111111111 binary) may be captured. The values contained in fields 1802 and 1803 correspond to the values in the TR field of an MPEG video specific header such that a range of values is denoted by the range of 1 to 5 as illustrated in field 1802 and 1803. This range of values may, in some embodiments, be used to tag or otherwise denote certain portions of a media stream that should not be entitled to expedited viewing or listening during, for example, a fast-forward mode.

FIG. 19 is a diagram of an example implementation of module 1405. Described is a module 1901 that inserts a metadata file into the beginning of the media stream. Also described is a metadata file 1902 inserted at the beginning of a media stream that starts with a data packet formatted using RTP. Described within this data packet is a RTP fixed header 1501, an MPEG specific header 1502, and an RTP payload 1503. In some cases this metadata file, as may be described below, is a XML file, a fraud file, or some other suitable file type.

FIG. 20 is a flow chart describing an example method used to implement a module 1216. Illustrated is module 2001 that is used to get or obtain tags to be searched for in certain MPEG packets. In some embodiments, this get operation is a SQL operation wherein certain tags are selected from a database. Once these tags are obtained, a module 2002 is implemented that facilitates reviewing of the digital content or media stream at an expedited rate. This expedited rate may be akin to the number of frame views found in, for example, a media player application viewing digital content in some type of fast-forward mode (e.g., 60 FPS, 80 FPS, 90 FPS, etc.) By contrast, normal rate may be, for example, 30 FPS. Once the digital content is used in at expedited rate, a decisional module 2003 is executed wherein it is determined whether or not a TR value has been encountered within the media stream. In those cases where a TR value has been encountered, a module 2004 is executed that plays the digital content and media stream at a normal rate. This normal rate may be akin to, for example, a play operation in a media player application and the frame speed associated with that play operation. In those cases where decisional module 2003 evaluates to "false", the module 2002 is executed to review the digital content or media stream at the expedited rate. Once the module 2004 is executed, a decisional module 2005 is executed that determines whether or not the TR range corresponding to the tagging data values has ended or not. In those cases where the decisional module 2005 evaluates to "false", the module 2004 continues to execute to play the digital content or media stream at a normal rate. In those cases where the decisional module 2005 evaluates to "true", a module 2006 is executed that gets the next tagging data value. Once the next tagging data value is obtained, then the module 2002 is executed to review the content at an expedited rate until a TR value corresponding to a tagging data value is encountered (see e.g., decisional module 1216).

In some embodiments, a data structure (e.g., an array, list, stack queue, hash table, or radix tree) is generated to serve as a lookup table into which is stored the range of values described in, for example, fields 1505, 1802 and 1803. These TR values may be taken from a metadata file 1902. Once stored, various TR values are extracted from data packets in a media stream and compared to the TR values looked up in the lookup table (see e.g., module 2003). Where a matching value is found in the lookup table, the media stream is played at a non-expedited rate (see e.g., module 2004). The following is an example lookup table:

00000000000000000000001
00000000000000000000010
00000000000000000000011
...
11111111111111111111111

Some embodiments may include a data structure that allows for an amortized constant time lookup (e.g., O(1)) such as a hash table, or near constant time lookup (e.g., O(lgn)) such as radix tree or other suitable data structure. In some cases, the TR values in the lookup table may be stored sequentially (e.g., using a list or array) such that a true constant time lookup is possible. In some embodiments, this lookup table may be stored in a persistent or non-persistent memory medium such as database 111.

FIG. 21 is a flow chart describing an example method used to implement module 1216. Described is a module 2101 that receives digital content. Once the digital content is received, a module 2102 is executed that reviews this digital content at an expedited rate. While the digital content is reviewed at an expedited rate, a decisional module 2103 is executed that determines whether or not a tagging data value has been encountered within the digital content or media stream. In those cases where decisional module 2103 evaluates to "false", the module 2102 continues to execute reviewing the digital content at an expedited rate. In those cases where decisional module 2103 evaluates to "true", a module 2104 is executed that plays the digital content at a normal rate. This content continues to play at a normal rate until a decisional module 2105 is executed that determines whether or not the digital content or media stream no longer contains a tagging data value (e.g., bit flag value). In those cases where decisional module 2105 evaluates to "false", then the digital content or media stream continues to play at a normal rate via module 2104. In those cases where decisional module 2105 evaluates to "true", then the module 2212 is executed to continue reviewing the digital content at an expedited rate.

In some embodiments, both the audio and video portion of the media stream may play at a normal rate where the tagging data or certain TR values are encountered, while, in some embodiments, only the audio or video portion may play at a normal rate. The determination of whether only the audio or video portion or both may play at a normal rate may be based upon where the tagging data is encountered (e.g., in an MPEG specific audio header 1508, or an MPEG specific video header 1502), or may be based upon an instruction set provided by a metadata file. In cases where a range of TR values (see e.g., fields 1802 and 1803) is used as the basis for determining what portion of an media stream may play at a normal rate during, for example, a fast-forward operation, a default to audio and video, or only audio, or only video may be set.

Example Case: Generation of Metadata File and Insertion into a Media Stream

In some embodiments, a metadata file is used to provide tagging data for a portion of digital content. This tagging data may be one or more TR values reflecting those video frames or other portions of digital content (e.g., RTP payloads) not entitled to expedited reviewing via, for example, a fast-forward mode. In some cases, this metadata file is written in XML and has the following example format:

```
<Tagging>
    <TimeBegin>1</TimeBegin>
    <TimeEnd>32534</TimeEnd>
    <TimeBegin>32567</TimeBegin>
    <TimeEnd>435667</TimeEnd>
    <TimeBegin>667865</TimeBegin>
    <TimeEnd>756777</TimeEnd>
    ...
    ...
</Tagging>
```

In instances where a metadata file is implemented, this metadata file is inserted at the beginning of a media stream to provide instruction as to what video frames or other portions of digital content may not receive expedited reviewing.

In some embodiments, a flat file may be used to provide tagging data for a portion of digital content. Where a flat file is used, a delimiter may be implemented to distinguish different types of data. This delimiter may be any type of Universal Character Set (Unicode) or American Standard Code for Information Interchange (ASCII) character. For example, the tagging data in a flat file could have the form: 1 32534; 32567 435667; 667865 756777, where the delimiter between ranges of tagging data is a semicolon (";"). As with the XML implementation, this flat file may be placed at the beginning of a media stream. In some embodiments, the tagging data contain in the metadata file (e.g., an XML file or flat file) is inserted into a lookup table such as that described above.

In cases where tagging data and/or tagged digital content is transported across a network (see e.g., FIGS. 3, 4, 7, and 8), a media session is initiated using either HTTP alone or using HTTP in combination with a Real Time Streaming Protocol (RTSP). In cases where HTTP alone is used, an HTTP call is made to web server 309 to retrieve (e.g., to GET), for example, a tagged digital content file from the media server 310. Once retrieved, the tagged digital content file may be played on one or more of the devices 102.

Some embodiments may include the use of HTTP and RTSP together to obtain tagged digital content or tagging data. In such an embodiment, HTTP would be used to set up a media streaming session between, for example, the web server 309 and media server 310, and one or more of the devices 102. Once the session was established, a presentation description file would be sent from the web server 309 to one of the devices 102. This file may have the following format:

```
<title>HOME MOVIES</title>
<session>
    <group language=en lipsync>
        <switch>
            <track type=audio
                e="PCMU/8000/1"
                src = "rtsp://audio.example.com/homemovies/audio.en/
                lofi">
            <track type=audio
                e="DVI4/16000/2" pt="90 DVI4/8000/1"
                src="rtsp://audio.example.com/homemovies/audio.en/
                hifi">
        </switch>
        <track type="video/mpeg"
            src="rtsp://video.example.com/homemovies/video">
        <tagging= yes>
    </group>
</session>
```

In the above example, a tagging tag (e.g., <tagging=yes>) is provided to put, for example, a media player on notice that for this session, tagging data is contained in the RTP data packets (see e.g., FIGS. 16-18 above) and needs to be read by the media player or other device performing or receiving RTP data packets. In some embodiments, a metadata tag (e.g., <metadata=yes> is provided in lieu of the tagging tag so as to instruct the receiving device and application residing thereon that a metadata file is being used to denote those ranges of frames not entitled to expedited viewing.

Example Systems to Implement

In some embodiments, a system is described as including a generator residing on a computer system to generate tagging data to tag certain portions of digital content to be played at a normal rate as tagged digital content, wherein a certain number of FPS is considered to be the normal rate, and an first inserter residing on the computer system (e.g., one of the devices 102) to insert the tagging data into a field of a data packet to create tagged digital content. Moreover, system may further include a receiver residing on the computer system to receive tagged digital content, an extractor residing on the computer system to extract the tagging data from the tagged digital content, and an second inserter residing on the computer system to insert the extracted tagging data into a lookup table to be used to determine which tagged digital content is entitled to be played at the normal rate. Additionally, the system may further include a player residing on the computer system to play the tagged digital content at an expedited rate, wherein the player is a media player that reads the tagged digital content at a certain number of FPS considered to be an expedited rate, and a reader residing on the computer system to read the tagged digital content to determine whether a specific TR value has been encountered, and where a TR value is encounter the player plays the portion of the tagged digital content at a normal rate, wherein the tagging data is one of a group of data types selected from the group consisting of a bit flag, and a range of TR values. Further, the data packet contains a header type that is selected from the group of header types consisting of a RTP header, a MPEG video specific header, and a MPEG audio specific header. Moreover, the system may further comprising a database (e.g., database 111) operatively coupled to the computer system to store the tagged digital content. In addition, the system may further comprising a database (e.g., database 111) operatively coupled to the computer system to store the tagging data.

Some embodiments may include a system including a generator residing on a computer system to generate a metadata file to denote certain portions of digital content to be played at a normal rate, wherein a certain number of FPS is considered to be the normal rate, and an inserter residing on the computer system to insert the metadata file into a media stream containing the certain portions of digital content. Moreover, the system may further include a receiver residing on the computer system to receive the media stream, a reader residing on a computer system to read TR values from the metadata file to determine which portions of the digital content are to be played at a normal rate, an extractor residing on the computer system to extract the TR values from the metadata file, and an insertor residing on the computer system to insert the TR values into a lookup table. Additionally, the system may further include a player to play the media stream at an expedited rate, wherein the player is a media player and the expedited rate is considered to be certain number of FPS, a reader to read both the metadata file and the certain portions of digital content contained within the media stream, and comparing the TR values contained within this metadata file to TR values contained in the certain portions of digital content, wherein the reader is apart of the media player, and playing the media stream at the normal rate, where there is a correspondence between the TR values in the metadata file and the TR values contained in the certain portions of digital content. Further, the system may include the player configured to play only an audio portion of the digital content at a normal rate, where a specific TR value is encountered. The system may also include the player configured to play only a video portion of the digital content at a normal rate, where a specific TR value is encountered.

Some embodiments may include an apparatus that includes means for generating tagging data using a computer system to tag certain portions of digital content for playing at a normal rate as tagged digital content, wherein the playing is conducted by a media player reading the portions of digital content at a certain number of FPS considered to be the normal rate, and means for inserting the tagging data into a field of a data packet, that is apart of the certain portion of digital content, to create tagged digital content.

FIG. 22 is a block diagram of an example system 2200 illustrating the generation of tagging data, the insertion of this tagging data into a data packet, and the reception and playing of this tagged digital content. Described is a device 102 containing a number of blocks or modules 2201 and 2202. These modules 2201-2202, and even the modules 2206, 2208-2210, described below, may reside not only on one or more of the devices 102, but may also reside on, for example, a media server 310. With respect to the module 2202, this module acts as a generator of tagging data and may, in some embodiments, be a user tagging interface 112. Once tagging data, such as tagging data 201, is generated it is inserted by an insertor such as 2201 into a data packet (see e.g., 107) to create tagged digital content. This tagged digital content 2204 is transmitted over a network such as network 2203. After transmission, the tagged digital content 2204 is received by, for example, one of the devices 102, and a receiver 2206 residing on one of these devices. This receiver may be a network adaptor card or other common network interface. Next, this receiver 2206 may be operatively coupled to an extractor module 2207 that may act to parse the tagged digital content 2205 using some predefined grammar. Once parsed, an insertor may take this parsed, tagged digital content 2204, and place the tagging data derived from it into a lookup table contained in some of persistent or non-persistent storage medium (e.g., database 111). In some cases, the entire tagged digital content is also stored into the database 111. In some embodiments, a reader module 2209 may read the tagged digital content or only the tagging data stored into the database 111, and pass it to a player application 2210 such as the above described player applications. The playing may follow the method outline above in FIGS. 20 and 21. Further, the methods outlined in FIG. 12 may also be implemented using the various modules of this figure.

Figure 23:
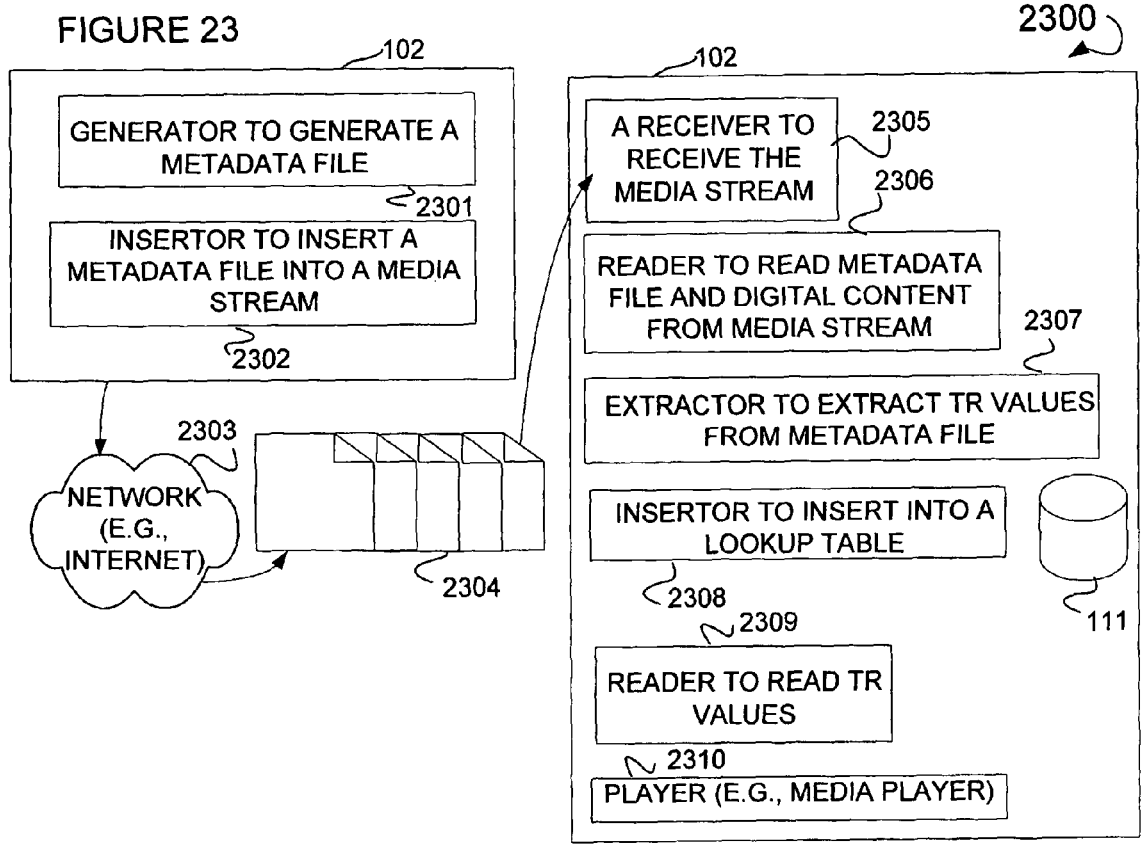
FIG. 23 is a block diagram of an example system illustrating the various blocks or modules involved in the generation of metadata, the insertion of this metadata in to a media stream, and the reception and playing of the digital content contained in this media stream.

FIG. 23 is a block diagram of an example system 2300 illustrating the various blocks or modules involved in the generation of metadata, the insertion of this metadata in to a media stream, and the reception and playing of the digital content contained in this media stream. Described is a module 2301 and 2302 residing on one or more of the devices 102. In some embodiments, these modules 2301 and 2302 may reside on a media server 310. In some cases, a module 2301 will be used to generate a metadata file (e.g., metadata file 1902), that will then be inserted into a media stream 2304 using the insertor module 2302. This process is described in FIG. 19. Once inserted, a transmitter (not pictured) transmits the media stream 2304 containing the metadata file across a network 2303 to a receiver 2305 located on one or more devices 102. This receiver 2305, and modules 2306-2310, may also reside on a media server 310. The receiver may be some type of network adaptor card or other device used to provide a network interface. This receiver 2305 then may pass the media stream 2304 to a reader module 2306 to read a metadata file and digital content from a media stream. This reader module 2306, in some embodiments, contains a parser to parse the media stream based upon some predefined grammar. An extractor module 2307 may then extract TR values from a metadata file, and pass these values to an insertor module 2308, for insertion into a persistent or non-persistent storage medium such as data base 111. In some cases, a reader module 2309 may read TR values from the lookup table and from the digital content, and where a correspondence is found, then the digital content will be played at a normal rate as defined above. The playing may be performed by a player module 2310 or application reading, interpreting, or otherwise reviewing the digital content. Further, the methods outlined in FIG. 12 may also be implemented using the various modules of this figure.

Storage Level

Some embodiments may include a Storage level wherein tables of data are created and data is inserted into or selected from these tables using a SQL or some other database-related language known in the art. These tables of data can be managed using a database application such as, for example, MYSQL™, SQLServer™, Oracle 8I™ or 10G™, or some other suitable database application. These tables are organized into a RDS or Object-Relational-Database Schemas (ORDS), as is known in the art. These schemas can be normalized using certain normalization algorithms so as to avoid abnormalities such as non-additive joins and other problems. Additionally, these normalization algorithms include Boyce-Codd Normal Form or some other normalization, optimization algorithm known in the art. Some embodiments may include creating a series of database tables containing data related to digital content.

Figure 24:
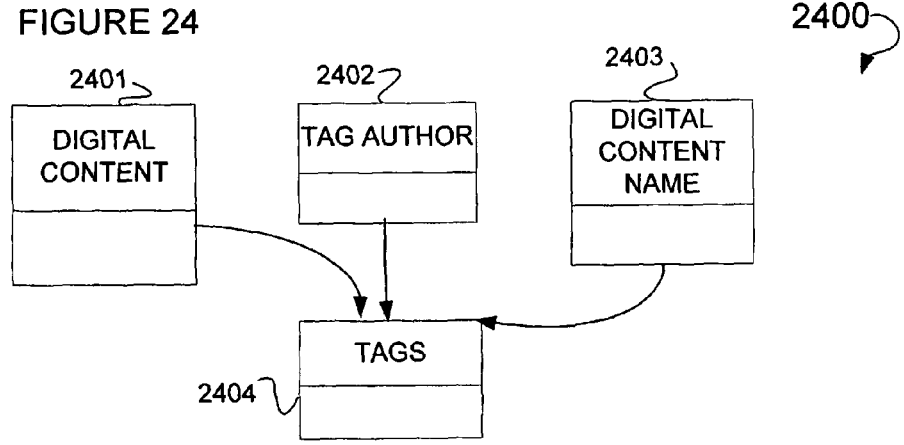
FIG. 24 is an example Relational Data Schema (RDS).

FIG. 24 is an example relational data schema 2400. Described is a digital content table 2401, a tag author table 2402, and a digital content name table 2403. Each of these tables (e.g., 2401-2403) are constrained by tagging data contained in the tags table 2404. With regard to the digital content table 2401, digital content may be stored in this table in the form of a Binary Large Object (BLOB), or some other suitable data type. With regard to table 2402, data relating to the author of a particular tag may be stored in the form of a character, string, or other suitable data type. With regard to table 2403, the name of the digital content may be stored in the form of a string or other suitable data type. As to the data to be stored in table 2404, this data may be in the form of certain numeric values and may be stored as, for example, a integer double flow or some other suitable data type.

Component Design

Some example embodiments may include the above described three tiers or levels being written as one or more software modules with each module contributing to the functionality of each level or tier. Common too many of these modules is the ability to generate, use, and manipulate the above-described tagging data and/or sets of data sets. These modules and associated functionality may be used by the client, server, or peer applications. These various modules can be implemented into the system on an as-needed basis. These modules may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), or Distributed Component Object Model (DCOM) or other suitable technique. These modules are linked to other modules via various APIs and then compiled into one complete server and/or client application. The process for using modules in the building of client and server applications is well known in the art. Further, these modules and the tiers that they make up are linked together via various distributed programming protocols as distributed computing modules.

Distributed Computing Modules

Some example embodiments may include remote procedure calls being used to implement one or more of the above described levels of the three-tier architecture across a distributed programming environment. For example, a Logic level resides on a first computer system that is remotely located from a second computer system containing an Interface or Storage level. These first and second computer systems can be configured in a server-client, peer-to-peer, or some other configuration. These various levels can be written using the above described component design principles and can be written in the same programming language or a different programming language. Various protocols are implemented to enable these various levels and components contained therein, to communicate regardless of the programming language used to write these components. For example, a module written in C++ using the Common Object Request Broker Architecture (CORBA) or Simple Object Access Protocol (SOAP) can communicate with another remote module written in JAVA™. These protocols include SOAP and CORBA or some other suitable protocol. These protocols are well-known in the art.

A Computer System

Figure 25:
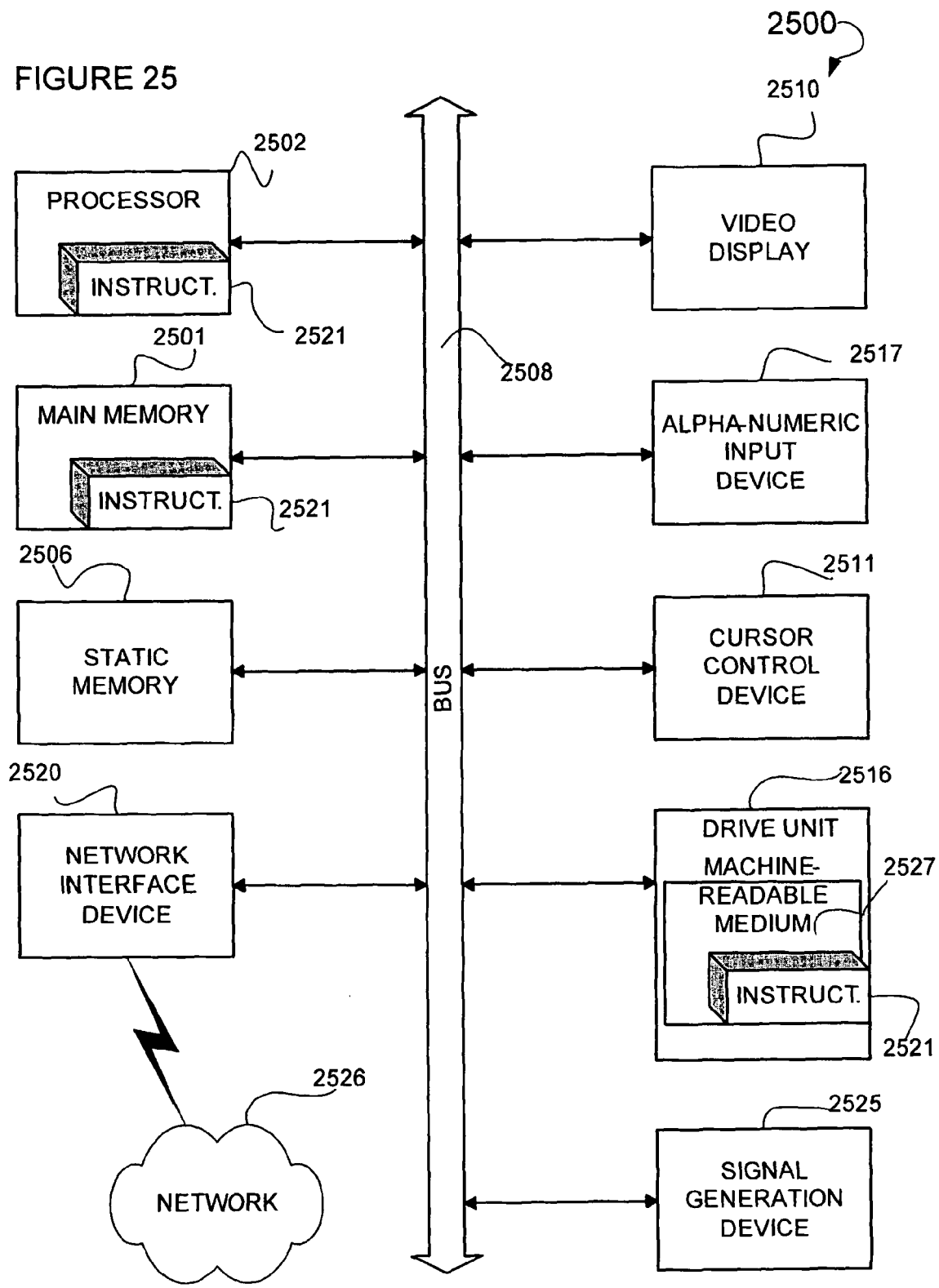
FIG. 25 shows a diagrammatic representation of a machine in the example form of a computer system.

FIG. 25 shows a diagrammatic representation of a machine in the example form of a computer system 2500 that executes a set of instructions to perform any one or more of the methodologies discussed herein. One of the devices 102 may configured as a computer system 2500. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2500 includes a processor 2502 (e.g., a Central Processing Unit (CPU), a Graphics Processing Unit (GPU) or both), a main memory 2501, and a static memory 2506, which communicate with each other via a bus 2508. The computer system 2500 may further include a video display unit 2510 (e.g., a Liquid Crystal Display (LCD) or a Cathode Ray Tube (CRT)). The computer system 2500 also includes an alphanumeric input device 2517 (e.g., a keyboard), a user interface (UI) cursor controller 2511 (e.g., a mouse), a disk drive unit 2516, a signal generation device 2525 (e.g., a speaker) and a network interface device (e.g., a transmitter) 2520.

The disk drive unit 2516 includes a machine-readable medium 2527 on which is stored one or more sets of instructions and data structures (e.g., software) embodying or used by any one or more of the methodologies or functions described herein. The software may also reside, completely or at least partially, within the main memory 2501 and/or within the processor 2502 during execution thereof by the computer system 2500, the main memory 2501 and the processor 2502 also constituting machine-readable media.

The instructions 2521 may further be transmitted or received over a network 2526 via the network interface device 2520 using any one of a number of well-known transfer protocols (e.g., HTTP, Session Initiation Protocol (SIP)).

The term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies described herein. The term "machine-readable medium" shall accordingly be taken to include, but not be limited to, solid-state memories, optical and magnetic medium, and carrier wave signals.

Marketplace Applications

In some embodiments, the method described herein may be added as a plug-in feature to an existing media player application, while in other embodiments this method may be a part of an existing media player application. In some cases, a user may tag certain portions of digital content that the user deems important for others when viewing such that these portions of the digital content should not be passed when viewing and/or listening to the digital content using a fast-forward mode. Further, in some cases, a viewer may want to only hear the audio or only the video at normal rate when using the fast-forward mode. Such viewing may be facilitated by the method and system described herein. Moreover, as previously alluded to, a user need not be reliant upon certain visual cues when reviewing digital content in a fast-forward mode.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
providing a user interface that facilitates generating and inserting tagging data for certain portions of digital content, the user interface comprising an inserter to insert tags into fields of data packets;
generating, using a processor of a machine, tagging data to tag certain portions of digital content to be played at a normal rate during playing of the digital content at an expedited rate, wherein the playing is conducted by a media player, residing on a device that reads the tagged portions of the digital content at a certain number of Frames Per Second (FPS) considered to be the normal rate during playing of the digital content at the expedited rate, each tagged portion being a segment of the digital content; and
inserting the tagging data into a field of a data packet that is a part of the certain portions of digital content to create tagged digital content.

2. The method of claim 1, wherein the tagging data is one of a group of data types selected from the group consisting of a bit flag and a range of Temporal Reference (TR) values.

3. The method of claim 1, wherein the data packet contains header types selected from the group of header types consisting of a Real-Time Transport Protocol (RTP) header, a Motion Picture Experts Group (MPEG) video specific header, and a MPEG audio specific header.

4. The method of claim 1, wherein the playing of the digital content at the expedited rate occurs during a fast-forward mode.

5. The method of claim 1, wherein the playing of the digital content at the expedited rate occurs during a reverse mode.

6. The method of claim 1, wherein the tagged portions of the digital content to be played at the normal rate comprise an audio portion of the digital content to be played at the normal rate and a corresponding video portion to be played at the expedited rate.

7. The method of claim 1, wherein the tagged portions of the digital content to be played at the normal rate comprise a video portion of the digital content to be played at the normal rate and a corresponding audio portion to be played at the expedited rate.

8. The method of claim 1, wherein the tagged portions of the digital content to be played at the normal rate comprise both a video portion and a corresponding audio portion to be played at the normal rate.

9. A computer-implemented method comprising:
receiving tagged digital content at a device having a media player residing thereon, the tagged digital content indicating a portion of the tagged digital content to be played at a normal rate during playing of the tagged digital content at an expedited rate;
playing the tagged digital content at the expedited rate, the playing is conducted by the media player reading the portions of the tagged digital content at a certain number of Frames Per Second (FPS) considered to be the expedited rate;
reading the tagged digital content to determine whether a specific Temporal Reference (TR) value has been encountered; and
playing the portion of the tagged digital content at the normal rate based on the specific TR value being encountered during the playing of the tagged digital content at the expedited rate, the portions being a segment of the tagged digital content.

10. A computer-implemented method comprising:
generating, using a processor of a machine, tagging data to be matched with certain portions of digital content for playing at a normal rate during playing of the digital content at an expedited rate, the playing is conducted by a media player, residing on a device, that reads the tagged portions of the digital content at a certain number of Frames Per Second (FPS) considered to be the normal rate during the playing of the digital content at the expedited rate, the tagged portions each being a segment of the digital content; and
storing the tagging data into a file.

11. The method of claim 10, wherein the tagging data is one of a group of data types selected from the group consisting of a bit flag and a range of Temporal Reference (TR) values.

12. The method of claim 10, wherein the digital content contains data packets with header types selected from the group of header types consisting of a Real-Time Transport Protocol (RTP) header, a Motion Picture Experts Group (MPEG) video specific header, and a MPEG audio specific header.

13. A computer-implemented method comprising:
receiving a file containing tagging data at a device having a media player residing thereon;
extracting, using a processor of a machine, the tagging data from the file;
inserting individual values of the tagging data into a lookup table as a tagging data value to be used to determine data packets to be viewed at a normal rate that is considered to be a certain number of Frames Per Second (FPS) during playing of digital content at an expedited rate;

retrieving the digital content in a form of a plurality of data packets, wherein the digital content is retrieved separately from the file containing the tagging data;

playing the digital content at the expedited rate, the playing is conducted by the media player reading portions of the digital content at a certain number of FPS considered to be the expedited rate;

looking for a match between a Temporal Reference (TR) value in a data packet and the tagging data value contained in the lookup table; and playing a segment of the digital content corresponding to the matching TR value at a normal rate during the playing of the digital content at the expedited rate, the playing being conducted using the media player.

14. The method of claim 13, wherein the file containing tagging data is generated at a first device using a first interface, and communicated to the device having the media player, the device retrieving the digital content separately from the file.

15. A system comprising:
a generator, residing on a device, to generate tagging data to tag certain portions of digital content fix playing at a normal rate as tagged digital content during playing of the digital content at an expedited rate, the playing is conducted by a media player, residing on a device, that reads the tagged portions of digital content at a certain number of Frames Per Second (FPS) considered to be the normal rate during the playing of the digital content at the expedited rate, the tagged portions each being a segment of the digital content; and an insertor, residing on the device, to insert the tagging data into a field of a data packet that is a part of the certain portions of the digital content to create tagged digital content.

16. The system of claim 15, wherein the tagging data is one of a group of data types selected from the group consisting of a hit flag and a range of Temporal Reference (TR) values.

17. The system of claim 15, wherein the data packet contains header types selected from the group of header types consisting of a Real-Time Transmission Protocol (RTP) header, a Motion Picture Expelis Group (MPEG) video specific header, and a MPEG audio specific header.

18. A system comprising:
a receiver, residing on a device, to receive tagged digital content at the device;
a media player, residing on the device, to play the tagged digital content at an expedited rate, the playing is conducted by the media player reading the tagged digital content at a certain number of FPS considered to be the expedited rate; and a reader, residing on the device, to read the tagged digital content to determine whether a specific Temporal Reference (TR) value has been encountered, and to play a segment of the tagged digital content associated with the specific TR value at the normal rate during the playing of the tagged digital content at the expedited rate.

19. A system comprising:
a generator, residing on a device, to generate tagging data to be matched with certain portions of digital content to be played at a normal rate during playing of the digital content at an expedited rate, the playing is conducted by a media player, residing on a device, that reads the portions of the digital content at a certain number of Frames Per Second (FPS) considered to be the normal rate during the playing of the digital content at the expedited rate, the portions each being a segment of the digital content; and a database operatively coupled to the device to store the tagging data into a file on the database.

20. The system of claim 19, wherein the tagging data is one of a group of data types selected from the group consisting of a bit flag and a range of Temporal Reference (TR) values.

21. The system of claim 19, wherein the digital content contains data packets with header types selected from the group of header types consisting of a Real-Time Transport Protocol (RTP) header, a Motion Picture Expelis Group (MPEG) video specific header, and a MPEG audio specific header.

22. A system comprising:
a receiver, residing on a device, to receive a file containing tagging data;
an extractor, residing on the device, to extract the tagging data from the file, and to insert individual values of the tagging data into a lookup table as a tagging data value to be used to determine data packets to be viewed at a normal rate that is considered to be a certain number of Frames Per Second (FPS) during playing of digital content at an expedited rate;
a media player, residing on the device, to play the digital content in the form of data packets at the expedited rate, a certain number of FPS considered to be the expedited rate; and
a reader, residing on the device, to look for a match between a Temporal Reference (TR) value in a data packet and the tagging data value contained in the lookup table, the media player to play the data packet at a normal rate where a match is found rate during the playing of the digital content at the expedited rate, the data packet representing a segment of the digital content.

* * * * *